(12) United States Patent
Bock et al.

(10) Patent No.: US 12,364,307 B2
(45) Date of Patent: Jul. 22, 2025

(54) ARTICLE OF FOOTWEAR HAVING A DISPLAY SYSTEM

(71) Applicant: PUMA SE, Herzogenaurach (DE)

(72) Inventors: Markus Bock, Herzogenaurach (DE); Reinhold Sussmann, Scheinfeld (DE)

(73) Assignee: PUMA SE, Herzogenaurach (DE)

( * ) Notice: Subject to any disclaimer, the term of this patent is extended or adjusted under 35 U.S.C. 154(b) by 3 days.

(21) Appl. No.: 18/227,009

(22) Filed: Jul. 27, 2023

(65) Prior Publication Data
US 2024/0032642 A1 Feb. 1, 2024

Related U.S. Application Data

(60) Provisional application No. 63/394,022, filed on Aug. 1, 2022.

(51) Int. Cl.
| | |
|---|---|
| *A43B 3/44* | (2022.01) |
| *A43B 3/34* | (2022.01) |
| *G02F 1/167* | (2019.01) |
| *G06F 1/16* | (2006.01) |
| *G06F 3/147* | (2006.01) |
| *G09G 3/34* | (2006.01) |

(52) U.S. Cl.
CPC ............ *A43B 3/44* (2022.01); *A43B 3/34* (2022.01); *G06F 1/163* (2013.01); *G06F 1/1637* (2013.01); *G06F 3/147* (2013.01); *G09G 3/344* (2013.01); *G02F 1/167* (2013.01); *G09G 2354/00* (2013.01); *G09G 2360/144* (2013.01)

(58) Field of Classification Search
CPC .............. A43B 3/34; A43B 3/44; A43B 3/36
See application file for complete search history.

(56) References Cited

U.S. PATENT DOCUMENTS

| | | | | |
|---|---|---|---|---|
| 3,838,495 | A | | 10/1974 | Kuhnert |
| 5,343,445 | A | * | 8/1994 | Cherdak .................. A43B 3/00 368/110 |
| 5,813,148 | A | | 9/1998 | Guerra |
| 5,929,332 | A | * | 7/1999 | Brown ................. A61B 5/1036 600/592 |
| 6,017,128 | A | * | 1/2000 | Goldston ............... G08B 5/004 36/137 |
| 6,112,437 | A | * | 9/2000 | Lovitt ..................... G09F 13/04 36/137 |

(Continued)

FOREIGN PATENT DOCUMENTS

| | | |
|---|---|---|
| CN | 103572351 | 2/2014 |
| EP | 1517827 A1 | 3/2005 |

(Continued)

OTHER PUBLICATIONS

Shiftwear, Mar. 31, 2029, Internet Archive Wayback Machine, Shiftwear.com (Year: 2019).*

(Continued)

*Primary Examiner* — Patrick F Marinelli
(74) *Attorney, Agent, or Firm* — Quarles & Brady LLP

(57) ABSTRACT

A display system for an article of footwear includes a display device with an optoelectronic display, a control module that is configured to communicate with the display device, and a power source. The display system has a visual characteristic that is configured to correspond with a gait cycle of a user wearing the article of footwear.

17 Claims, 6 Drawing Sheets

(56) References Cited

U.S. PATENT DOCUMENTS

| | | | |
|---|---|---|---|
| 6,118,426 A | 9/2000 | Albert | |
| 6,252,564 B1 | 6/2001 | Albert | |
| 6,459,418 B1 | 10/2002 | Comiskey | |
| 6,621,766 B2 | 9/2003 | Brewer | |
| 6,639,578 B1 | 10/2003 | Comiskey | |
| 7,191,644 B2* | 3/2007 | Haselhurst | A43D 1/025 73/172 |
| 7,592,276 B2 | 9/2009 | Hill | |
| 7,728,811 B2 | 6/2010 | Albert | |
| 8,464,442 B1* | 6/2013 | Alford, II | A43B 3/34 36/137 |
| 8,529,267 B2* | 9/2013 | Morag | G09B 19/0038 434/247 |
| 8,769,836 B2 | 7/2014 | Donovan | |
| 9,226,542 B2* | 1/2016 | Hartford | A43B 5/06 |
| 9,776,041 B1 | 10/2017 | Lachwani | |
| 10,268,096 B2 | 4/2019 | Posset | |
| 10,393,165 B2 | 8/2019 | Kulzer | |
| 10,993,503 B2 | 5/2021 | Truitt | |
| 11,033,079 B2* | 6/2021 | Bock | A43C 11/20 |
| 11,089,825 B1* | 8/2021 | Ell | A43B 3/36 |
| 11,103,030 B2* | 8/2021 | Bock | A43C 11/20 |
| 11,154,111 B2* | 10/2021 | Donovan | A43B 23/0205 |
| 11,185,130 B2* | 11/2021 | Bock | A43B 3/44 |
| 11,430,379 B2* | 8/2022 | Cauwood | A43B 3/0078 |
| 11,439,192 B2* | 9/2022 | Bock | A42B 1/242 |
| 11,484,089 B2* | 11/2022 | Bock | A43C 1/00 |
| 11,737,507 B1* | 8/2023 | Chowdhury | A43B 3/48 36/136 |
| 11,771,180 B2* | 10/2023 | Bock | A43C 1/00 36/50.1 |
| 11,793,265 B2* | 10/2023 | Donovan | A43B 3/38 |
| 2004/0026280 A1* | 2/2004 | Herold | A63B 55/00 206/315.3 |
| 2004/0119681 A1 | 6/2004 | Albert | |
| 2005/0091884 A1* | 5/2005 | Omstead | A43B 3/34 36/137 |
| 2007/0049147 A1 | 3/2007 | Hill | |
| 2007/0285385 A1 | 12/2007 | Albert | |
| 2009/0113762 A1* | 5/2009 | Leimer | A43B 3/42 36/3 R |
| 2009/0233770 A1* | 9/2009 | Vincent | A63B 24/0075 482/8 |
| 2012/0199222 A1 | 8/2012 | Sullivan | |
| 2014/0173936 A1* | 6/2014 | Hartford | A43B 23/0205 36/100 |
| 2014/0373395 A1* | 12/2014 | White | A43B 3/12 36/137 |
| 2015/0221244 A1 | 8/2015 | Miller | |
| 2016/0227870 A1* | 8/2016 | Odland | H04N 5/64 |
| 2016/0324445 A1* | 11/2016 | Kim | A61B 5/6802 |
| 2016/0366972 A1* | 12/2016 | Wilken | A43B 3/0078 |
| 2016/0374171 A1* | 12/2016 | Wilken | G05B 15/02 |
| 2017/0055880 A1* | 3/2017 | Agrawal | A43B 3/38 |
| 2018/0235308 A1 | 8/2018 | Dungey | |
| 2019/0082756 A1* | 3/2019 | Arno | A41D 27/085 |
| 2019/0246745 A1* | 8/2019 | Bock | A43C 1/00 |
| 2019/0246746 A1* | 8/2019 | Bock | A43C 11/20 |
| 2019/0246747 A1* | 8/2019 | Bock | A43B 3/34 |
| 2019/0328067 A1* | 10/2019 | Bock | A42B 1/242 |
| 2020/0000373 A1* | 1/2020 | Agrawal | A61B 5/7405 |
| 2020/0180264 A1 | 6/2020 | Thostenson | |
| 2020/0326318 A1 | 10/2020 | Keller | |
| 2021/0118419 A1* | 4/2021 | Bock | A43B 3/50 |
| 2021/0251338 A1 | 8/2021 | Truitt | |
| 2021/0298428 A1* | 9/2021 | Bock | A43C 11/20 |
| 2021/0319745 A1* | 10/2021 | Cauwood | A43B 5/06 |
| 2021/0345963 A1* | 11/2021 | London | A61B 5/00 |
| 2022/0366839 A1* | 11/2022 | Cauwood | A43B 3/34 |
| 2023/0117142 A1* | 4/2023 | Bedri | A43B 7/00 600/595 |
| 2024/0008585 A1* | 1/2024 | Bock | A43B 13/12 |
| 2024/0032642 A1* | 2/2024 | Bock | A43B 23/24 |
| 2024/0041155 A1* | 2/2024 | Bock | G06F 1/1637 |
| 2024/0130461 A1* | 4/2024 | Bock | A43B 3/34 |
| 2024/0225171 A9* | 7/2024 | Bock | A43B 3/34 |

FOREIGN PATENT DOCUMENTS

| | | | |
|---|---|---|---|
| EP | 1582283 A1 | | 10/2005 |
| EP | 3069279 A1 | | 9/2016 |
| EP | 3535034 A4 | | 9/2020 |
| JP | 2014520638 A | * | 8/2014 |
| TW | M560214 U | * | 5/2018 |
| WO | 2012037445 A3 | | 7/2012 |

OTHER PUBLICATIONS

Shiftwear, Meet Shiftwear: App & Prototype, Jun. 5, 2017, Youtube, youtube.com/watch?v=3kvQqR3i8dE (Year: 2017).*

Walter Pirker and Regina Katzenschlager, Gait disorders in adults and the elderly, The Central Europeak Journal of Medicine (Wiener klinische Wochenschrift), Oct. 21, 2016 (Year: 2016).*

International Search Report with Written Opinion of PCT/IB2023/057641 mailed Nov. 6, 2023 (14 pages).

* cited by examiner

ARTICLE OF FOOTWEAR HAVING A DISPLAY SYSTEM

CROSS REFERENCE TO RELATED APPLICATIONS

This application claims the benefit of and priority from U.S. Provisional Application No. 63/394,022, filed on Aug. 1, 2022, and entitled "ARTICLE OF FOOTWEAR HAVING A DISPLAY SYSTEM," the contents of which is incorporated herein by reference in its entirety.

REFERENCE REGARDING FEDERALLY SPONSORED RESEARCH OR DEVELOPMENT

Not applicable

SEQUENCE LISTING

Not applicable

BACKGROUND

1. Field of the Invention

The present disclosure relates generally to an article of footwear having a display system, and more specifically to articles of footwear having display systems that include an optoelectronic display.

2. Description of the Background

Many conventional shoes or other articles of footwear generally comprise an upper and a sole attached to a lower end of the upper. Conventional shoes further include an internal space, i.e., a void or cavity, which is created by interior surfaces of the upper and sole, that receives a foot of a user before securing the shoe to the foot. The sole is attached to a lower surface or boundary of the upper and is positioned between the upper and the ground. As a result, the sole typically provides stability and cushioning to the user when the shoe is being worn. In some instances, the sole may include multiple components, such as an outsole, a midsole, and an insole. The outsole may provide traction to a bottom surface of the sole, and the midsole may be attached to an inner surface of the outsole and may provide cushioning or added stability to the sole. For example, a sole may include a particular foam material that may increase stability at one or more desired locations along the sole, or a foam material that may reduce stress or impact energy on the foot or leg when a user is running, walking, or engaged in another activity. The sole may also include additional components, such as plates, embedded with the sole to increase the overall stiffness of the sole and reduce energy loss during use.

The upper generally extends upward from the sole and defines an interior cavity that completely or partially encases a foot. In most cases, the upper extends over the instep and toe regions of the foot, and across medial and lateral sides thereof. Many articles of footwear may also include a tongue that extends across the instep region to bridge a gap between edges of medial and lateral sides of the upper, which define an opening into the cavity. The tongue may also be disposed below a lacing system and between medial and lateral sides of the upper, to allow for adjustment of shoe tightness. The tongue may further be manipulatable by a user to permit entry or exit of a foot from the internal space or cavity. In addition, a fastening system may allow a user to adjust certain dimensions of the upper or the sole, thereby allowing the upper to accommodate a wide variety of foot types having varying sizes and shapes.

The upper of many shoes may comprise a wide variety of materials, which may be utilized to form the upper and chosen for use based on one or more intended uses of the shoe. The upper may also include portions comprising varying materials specific to a particular area of the upper. For example, added stability may be desirable at a front of the upper or adjacent a heel region so as to provide a higher degree of resistance or rigidity. In contrast, other portions of a shoe may include a soft woven textile to provide an area with stretch-resistance, flexibility, air-permeability, or moisture-wicking properties.

However, in many cases, articles of footwear are configured with materials for visual communication and aesthetic purposes. For example, articles of footwear may include reflective materials for improving visibility of a user. Thus, there is a continuing need for articles of footwear having materials provided for visual communication and aesthetic purposes.

SUMMARY

An article of footwear, as described herein, may have various configurations. For example, an article of footwear may have an upper and a sole structure connected to the upper.

In some aspects, the present disclosure provides a display system for an article of footwear that includes a display device with an optoelectronic display, a control module configured to communicate with the display device, and a power source. The display system is configured such that a visual characteristic of the display device corresponds with a gait cycle of a user wearing the article of footwear.

In some embodiments, the gait cycle includes a stance phase, in which the article of footwear contacts a ground surface, and a swing phase, in which the article of footwear does not contact the ground surface. In some embodiments, the visual characteristic includes a first state that corresponds to the stance phase and a second state that corresponds to the swing phase. In some embodiments, the visual characteristic is at least one of: a color, a transparency, a gloss unit, a power level, or a pattern.

In some embodiments, the optoelectronic display includes electrophoretic ink. In some embodiments, the electrophoretic ink is integrally formed with an upper of the article of footwear.

In some embodiments, the display device is arranged on an upper of the article of footwear.

In some aspects, the present disclosure provides an article of footwear that includes a sole attached to an upper, and a display system. The display system includes a display device with an optoelectronic display and that is arranged on the upper, a control module configured to communicate with the display device, and a power source. The display system is configured such that a visual characteristic of the display device corresponds with a gait cycle of a user wearing the article of footwear.

In some embodiments, the control module is disposed within a midsole of the sole.

In some embodiments, the optoelectronic display is integrally formed with the upper.

In some embodiments, the display system further includes a sensor in electrical communication with the control module, and the control module is configured to, in response to signals received from the sensor, cause the display device to change between a first state and a second state. In some embodiments, the sensor is external to the article of footwear. In some embodiments, the sensor is arranged in the sole of the article of footwear. In some embodiments, the sensor is configured to measure pressure exerted on an insole of the sole.

In some embodiments, the article of footwear is a first article of footwear of a pair of footwear, the display system is a first display system, the control module is a first control module, and the visual characteristic of the first display system is a first visual characteristic that is configured to correspond with a gait cycle of a first foot of the user. The pair of footwear further includes a second article of footwear that includes a second display system, and a second visual characteristic of the second display system is configured to correspond with a gait cycle of a second foot of the user. In some embodiments, the second article of footwear further includes a second control module, and the first and second control modules are configured to be in electrical communication with an electronic device external to the pair of footwear.

In some aspects, the present disclosure provides a display system for an article of footwear that includes a display device that includes an optoelectronic display with electrophoretic ink, a control module configured to communicate with the display device, and a power source. The display system is configured such that a visual characteristic of the display device corresponds with a gait cycle of a user wearing the article of footwear. The gait cycle includes a stance phase, in which the article of footwear contacts a ground surface, and a swing phase, in which the article of footwear does not contact the ground surface. The display system is further configured such that a first state of the display device corresponds with the stance phase, and a second state of the display device corresponds with the swing phase.

In some embodiments, the display system further includes a sensor in electrical communication with the control module, and the control module is configured to, in response to signals received from the sensor, cause the display device to change between the first and second states.

In some embodiments, the control module is configured to provide a first electrical signal or a second electrical signal to the display system. The first electrical signal causes the display system to be in the first state, and the second electrical signal causes the display system to be in the second state.

In some embodiments, the control module is configured to receive a user input, such that the visual characteristic is customizable by a user via the user input.

Other aspects of the article of footwear, including features and advantages thereof, will become apparent to one of ordinary skill in the art upon examination of the figures and detailed description herein. Therefore, all such aspects of the article of footwear are intended to be included in the detailed description and this summary.

DETAILED DESCRIPTION OF THE DRAWINGS

Figure 1:
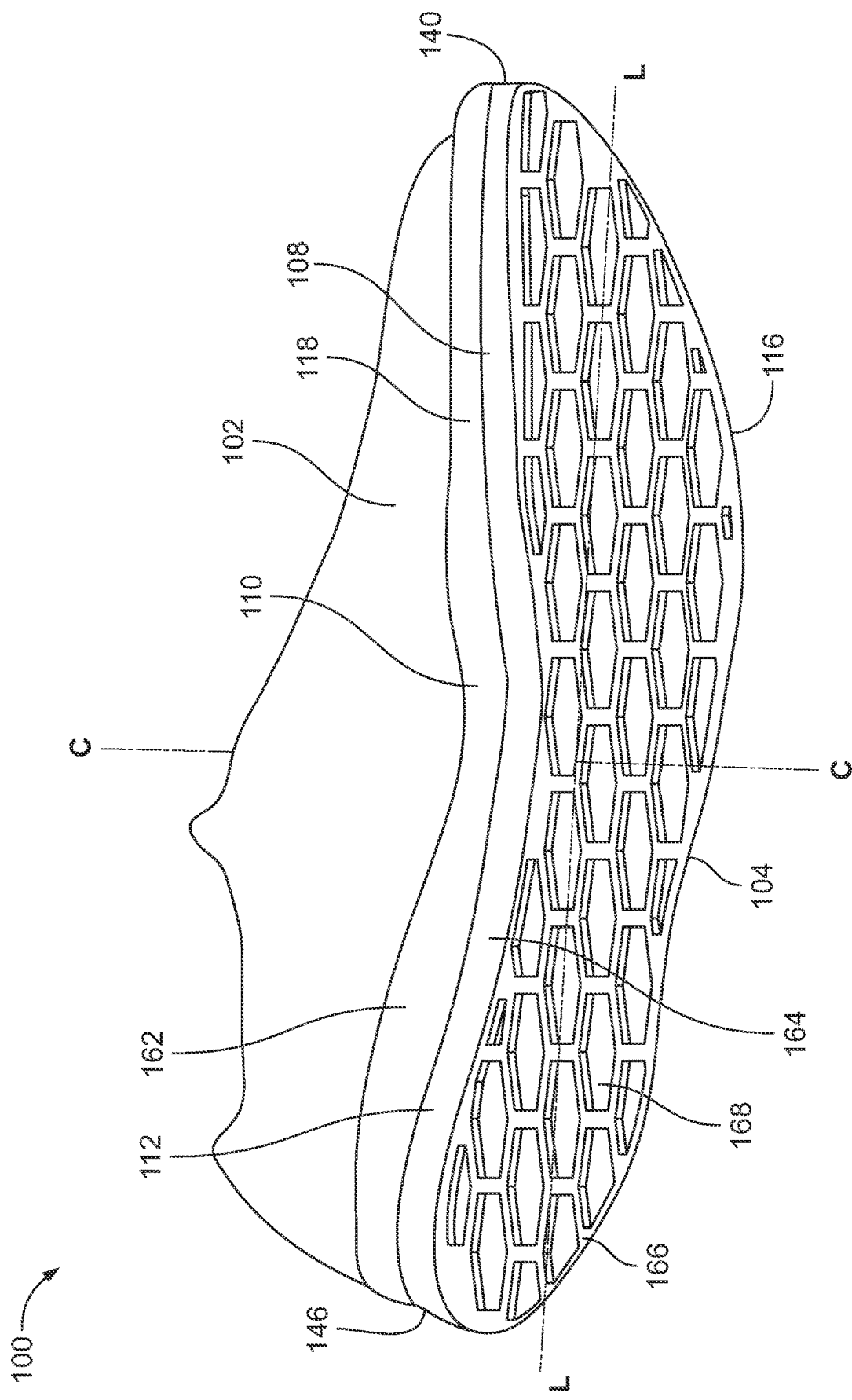
FIG. 1 is a perspective view of a bottom and medial side of an article of footwear configured as a left shoe that includes an upper and a sole structure, according to an embodiment of the disclosure.

Some aspects of the following discussion and accompanying figures disclose various embodiments or configurations of an article of footwear or a shoe and a sole structure. Although embodiments of a shoe or sole structure are disclosed with reference to a sports shoe, such as a running shoe, tennis shoe, basketball shoe, etc., concepts associated with embodiments of the shoe or the sole structure may be applied to a wide range of footwear and footwear styles, including cross-training shoes, football shoes, golf shoes, hiking shoes, hiking boots, ski and snowboard boots, soccer shoes and cleats, walking shoes, and track cleats, for example. Concepts of the shoe or the sole structure may also be applied to articles of footwear that are considered non-athletic, including dress shoes, sandals, loafers, slippers, and heels. In addition to footwear, particular concepts described herein may also be applied and incorporated in other types of apparel or other athletic equipment, including helmets, padding or protective pads, shin guards, and gloves. Even further, particular concepts described herein may be incorporated in cushions, backpack straps, golf clubs, or other consumer or industrial products. Accordingly, concepts described herein may be utilized in a variety of products.

The term "about," as used herein, refers to variation in the numerical quantity that may occur, for example, through typical measuring and manufacturing procedures used for articles of footwear or other articles of manufacture that may include embodiments of the disclosure herein; through inadvertent error in these procedures; through differences in the manufacture, source, or purity of the ingredients used to make the compositions or mixtures or carry out the methods; and the like. Throughout the disclosure, the terms "about" and "approximately" refer to a range of values±5% of the numeric value that the term precedes.

Further, as used herein, unless otherwise defined or limited, directional terms are used for convenience of reference for discussion of particular figures or examples. For example, references to "downward," or other directions, or "lower" or other positions, may be used to discuss aspects of a particular example or figure, but do not necessarily require similar orientation or geometry in all installations or configurations. The terms first, second, third, etc. may be used herein to describe various elements, components, regions, layers, and/or sections. These elements, components, regions, layers, and/or sections should not be limited by these terms. These terms may be only used to distinguish one element, component, region, layer, or section from another region, layer, or section. Terms such as "first," "second," and other numerical terms do not imply a sequence or order unless clearly indicated by the context. Thus, a first element, component, region, layer, or section discussed below could be termed a second element, component, region, layer, or section without departing from the teachings of the example configurations.

Aspects of the present disclosure are directed to an article of footwear and/or specific components of the article of footwear, such as an upper and/or a sole or sole structure. The upper may comprise a knitted component, a woven textile, and/or a non-woven textile. The knitted component may be made by knitting of yarn, the woven textile by weaving of yarn, and the non-woven textile by manufacture of a unitary non-woven web. Knitted textiles include textiles formed by way of warp knitting, weft knitting, flat knitting, circular knitting, and/or other suitable knitting operations. The knit textile may have a plain knit structure, a mesh knit structure, and/or a rib knit structure, for example. Woven textiles include, but are not limited to, textiles formed by way of any of the numerous weave forms, such as plain weave, twill weave, satin weave, dobbin weave, jacquard weave, double weaves, and/or double cloth weaves, for example. Non-woven textiles include textiles made by air-laid and/or spun-laid methods, for example. The upper may comprise a variety of materials, such as a first yarn, a second yarn, and/or a third yarn, which may have varying properties or varying visual characteristics.

The following discussion and accompanying FIGS. 1-7 disclose various embodiments or configurations of an article of footwear. The article of footwear can be provided as a pair of shoes including a first or left shoe and a second or right shoe. The left shoe and the right shoe may be similar in all material aspects, except that the left shoe and the right shoe are sized and shaped to receive a left foot and a right foot of a user, respectively. For ease of disclosure, a single shoe or article of footwear will be referenced to describe aspects of the disclosure. In some figures, the article of footwear is depicted as a right shoe, and in some figures the article of footwear is depicted as a left shoe. The disclosure below with reference to the article of footwear is applicable to both the left shoe and the right shoe. In some embodiments, there may be differences between the left shoe and the right shoe other than the left/right configuration. In some embodiments, the left shoe may include a frame, while the right shoe may not include the frame, or vice versa. Further, in some embodiments, the left shoe may include one or more additional elements that the right shoe does not include, or vice versa.

Figure 2:
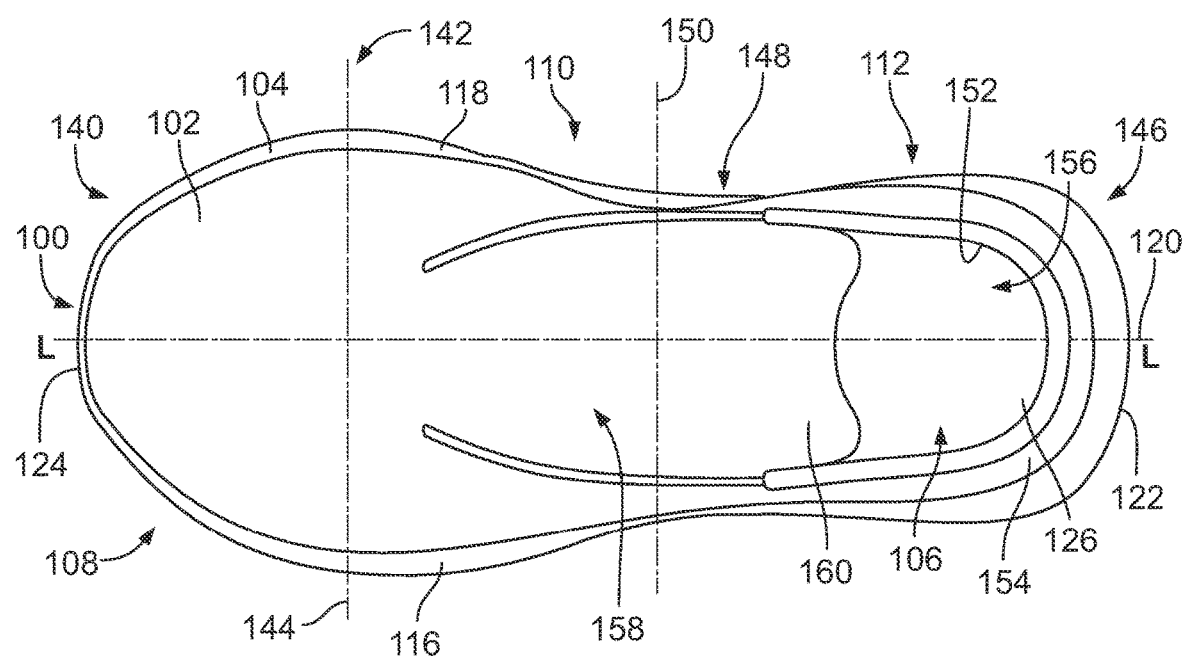
FIG. 2 is a top view of the article of footwear of FIG. 1.
Figure 3:
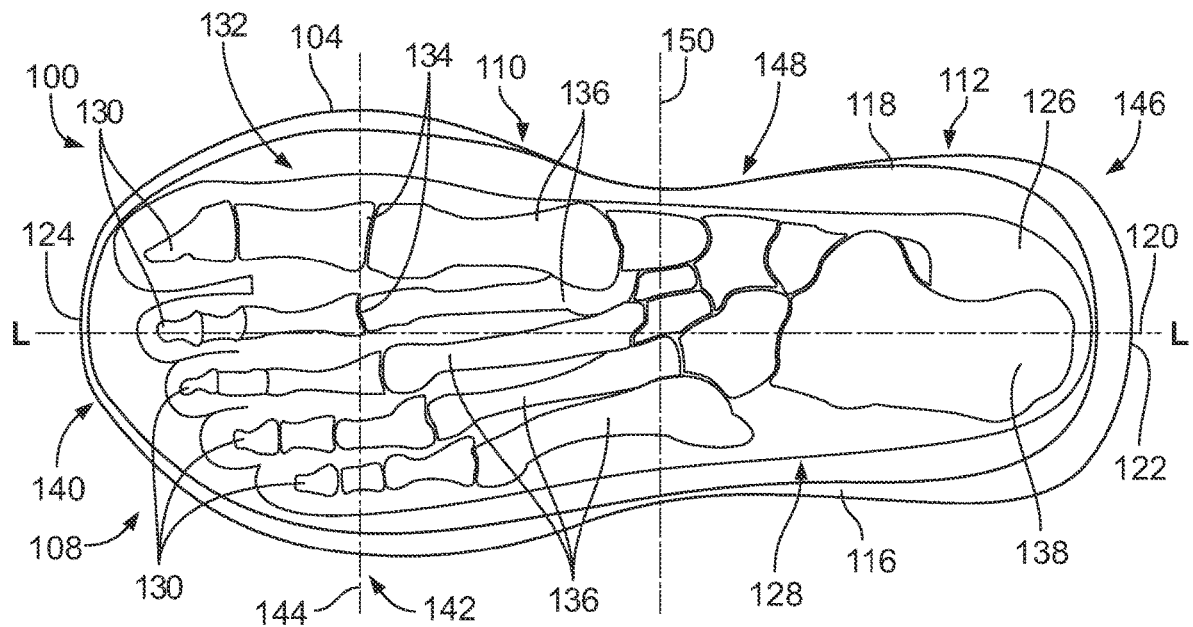
FIG. 3 is a top plan view of the article of footwear of FIG. 1 with an upper removed and a user's skeletal foot structure overlaid thereon.

Referring to FIGS. 1-3, an exemplary embodiment of an article of footwear 100 is shown, including an upper 102 and a sole structure 104. The upper 102 is attached to the sole structure 104 and together define an interior cavity 106 (see FIGS. 2 and 3) into which a user's foot may be inserted. For reference, the article of footwear 100 defines a forefoot region 108, a midfoot region 110, and a heel region 112 (see FIGS. 2 and 3). The forefoot region 108 generally corresponds with portions of the article of footwear 100 that encase portions of the foot that includes the toes, the ball of the foot, and joints connecting the metatarsals with the toes or phalanges. The midfoot region 110 is proximate and adjoining the forefoot region 108, and generally corresponds with portions of the article of footwear 100 that encase the arch of foot, along with the bridge of the foot. The heel region 112 is proximate and adjoining the midfoot region 110 and generally corresponds with portions of the article of footwear 100 that encase rear portions of the foot, including the heel or calcaneus bone, the ankle, and/or the Achilles tendon.

Many conventional footwear uppers are formed from multiple elements (e.g., textiles, polymer foam, polymer sheets, leather, and synthetic leather) that are joined through bonding or stitching at a seam. In some embodiments, the upper 102 of the article of footwear 100 is formed from a knitted structure or knitted components. In various embodiments, a knitted component may incorporate various types of yarn that may provide different properties to an upper. For example, one area of the upper 102 may be formed from a first type of yarn that imparts a first set of properties, and another area of the upper 102 may be formed from a second type of yarn that imparts a second set of properties. Using this configuration, properties of the upper 102 may vary throughout the upper 102 by selecting specific yarns for different areas of the upper 102.

With reference to the material(s) that comprise the upper 102, the specific properties that a particular type of yarn will impart to an area of a knitted component may at least partially depend upon the materials that form the various filaments and fibers of the yarn. For example, cotton may provide a soft effect, biodegradability, or a natural aesthetic to a knitted material. Elastane and stretch polyester may each provide a knitted component with a desired elasticity and recovery. Rayon may provide a high luster and moisture absorbent material, wool may provide a material with an increased moisture absorbance, nylon may be a durable material that is abrasion-resistant, and polyester may provide a hydrophobic, durable material.

Other aspects of a knitted component may also be varied to affect the properties of the knitted component and provide desired attributes. For example, a yarn forming a knitted component may include monofilament yarn or multifilament yarn, or the yarn may include filaments that are each formed of two or more different materials. In addition, a knitted component may be formed using a particular knitting process to impart an area of a knitted component with particular properties. Accordingly, both the materials forming the yarn and other aspects of the yarn may be selected to impart a variety of properties to particular areas of the upper 102.

In some embodiments, an elasticity of a knit structure may be measured based on comparing a width or length of the knit structure in a first, non-stretched state to a width or length of the knit structure in a second, stretched state after the knit structure has a force applied to the knit structure in a lateral direction. In further embodiments, the upper 102 may also include additional structural elements. In some embodiments, a heel plate or cover (not shown) may be provided on the heel region 112 to provide added support to a heel of a user. In some instances, other elements, e.g., plastic material, logos, trademarks, etc., may also be applied and fixed to an exterior surface using glue or a thermoforming process. In some embodiments, the properties associated with the upper 102, e.g., a stitch type, a yarn type, or characteristics associated with different stitch types or yarn types, such as elasticity, aesthetic appearance, thickness, air permeability, or scuff-resistance, may be varied.

Referring again to FIG. 1, the sole structure 104 is connected or secured to the upper 102 and extends between a foot of a user and the ground when the article of footwear 100 is worn by the user. The sole structure 104 may include one or more components, which may include an outsole, a midsole, a heel, a vamp, and/or an insole. In some embodiments, a sole structure may include an outsole that provides structural integrity to the sole structure, along with providing traction for a user, a midsole that provides a cushioning system, and an insole that provides support for an arch of a user. In addition, the insole may be a strobel board, a forefoot board, a lasting board, etc., or a combination thereof, and the insole may be provided between the upper 102 and the sole structure 104, or the insole may be provided as part of the upper 102.

Furthermore, the insole can be positioned within the interior cavity 106 of the upper 102, which can be in direct contact with a user's foot while the article of footwear 100 is being worn. Moreover, the upper 102 may also include a liner (not shown) that can increase comfort, for example, by reducing friction between the foot of the user and the upper 102, the sole 104, the insole, or the like, and/or by providing moisture wicking properties. The liner may line the entirety of the interior cavity 106 or only a portion thereof. In some embodiments, a binding (not shown) may surround the opening of the interior cavity 106 to secure the liner to the upper 102 and/or to provide an aesthetic element on the article of footwear 100.

Referring to FIGS. 2 and 3, the article of footwear 100 also defines a lateral side 116 and a medial side 118. When a user is wearing the shoes, the lateral side 116 corresponds with an outside-facing portion of the article of footwear 100 while the medial side 118 corresponds with an inside-facing portion of the article of footwear 100. As such, the article of footwear 100 has opposing lateral and medial sides 116, 118. The lateral and medial sides 116, 118 adjoin one another along a longitudinal central plane or axis 120 of the article of footwear 100, which is coplanar with the longitudinal axis L of FIG. 1. As will be further discussed herein, the longitudinal central plane or axis 120 may demarcate a central, intermediate axis between the lateral and medial sides 116, 118 of the article of footwear 100. Put differently, the longitudinal plane or axis 120 may extend between a rear, proximal end 122 of the article of footwear 100 and a front, distal end 124 of the article of footwear 100 and may continuously define a middle of an insole 126, the sole structure 104, and/or the upper 102 of the article of footwear 100, i.e., the longitudinal plane or axis 120 is a straight axis extending through the rear, proximal end 122 of the heel region 112 to the front, distal end 124 of the forefoot region 108.

Unless otherwise specified, and referring to FIGS. 2 and 3, the article of footwear 100 may be defined by the forefoot region 108, the midfoot region 110, and the heel region 112. The forefoot region 108 may generally correspond with portions of the article of footwear 100 that encase portions of a foot 128 that include the toes or phalanges 130, the ball 132 of the foot 128, and one or more of the joints 134 that connect the metatarsals 136 of the foot 128 with the toes or phalanges 130. The midfoot region 110 is proximate to and adjoins the forefoot region 108. The midfoot region 110 generally corresponds with portions of the article of footwear 100 that encase an arch of the foot 128, along with a bridge of the foot 128. The heel region 112 is proximate to and adjoins the midfoot region 110. The heel region 112 generally corresponds with portions of the article of footwear 100 that encase rear portions of the foot 128, including the heel or calcaneus bone 138, the ankle (not shown), and/or the Achilles tendon (not shown).

Still referring to FIGS. 2 and 3, the forefoot region 108, the midfoot region 110, the heel region 112, the lateral side 116, and the medial side 118 are intended to define boundaries or areas of the article of footwear 100. To that end, the forefoot region 108, the midfoot region 110, the heel region 112, the lateral side 116, and the medial side 118 generally characterize sections of the article of footwear 100. Certain aspects of the disclosure may refer to portions or elements that are coextensive with one or more of the forefoot region 108, the midfoot region 110, the heel region 112, the lateral side 116, and/or the medial side 118. Further, both the upper 102 and the sole structure 104 may be characterized as having portions within the forefoot region 108, the midfoot region 110, the heel region 112, and/or along the lateral side 116 and/or the medial side 118. Therefore, the upper 102 and the sole structure 104, and/or individual portions of the upper 102 and the sole structure 104, may include portions thereof that are disposed within the forefoot region 108, the midfoot region 110, the heel region 112, and/or along the lateral side 116 and/or the medial side 118.

With continued reference to FIGS. 2 and 3, the forefoot region 108, the midfoot region 110, the heel region 112, the lateral side 116, and the medial side 118 are shown in detail. The forefoot region 108 extends from a toe end 140 to a widest portion 142 of the article of footwear 100. The widest portion 142 is defined or measured along a first line 144 that is perpendicular with respect to the longitudinal axis 120 that extends from a distal portion of the toe end 140 to a distal portion of a heel end 146, which is opposite the toe end 140. The midfoot region 110 extends from the widest portion 142 to a thinnest portion 148 of the article of footwear 100. The thinnest portion 148 of the article of footwear 100 is defined as the thinnest portion of the article of footwear 100 measured across a second line 150 that is perpendicular with respect to the longitudinal axis 120. The heel region 112 extends from the thinnest portion 148 to the heel end 146 of the article of footwear 100.

It should be understood that numerous modifications may be apparent to those skilled in the art in view of the foregoing description, and individual components thereof, may be incorporated into numerous articles of footwear. Accordingly, aspects of the article of footwear 100 and components thereof, may be described with reference to general areas or portions of the article of footwear 100, with an understanding the boundaries of the forefoot region 108, the midfoot region 110, the heel region 112, the lateral side 116, and/or the medial side 118 as described herein may vary between articles of footwear. However, aspects of the article of footwear 100 and individual components thereof, may also be described with reference to exact areas or portions of the article of footwear 100 and the scope of the appended claims herein may incorporate the limitations associated with these boundaries of the forefoot region 108, the midfoot region 110, the heel region 112, the lateral side 116, and/or the medial side 118 discussed herein.

Still referring to FIGS. 2 and 3, the medial side 118 begins at the distal, toe end 140 and bows outward along an inner side of the article of footwear 100 along the forefoot region 108 toward the midfoot region 110. The medial side 118 reaches the first line 144, at which point the medial side 118 bows inward, toward the central, longitudinal axis 120. The medial side 118 extends from the first line 144, i.e., the widest portion 142, toward the second line 150, i.e., the thinnest portion 148, at which point the medial side 118 enters into the midfoot region 110, i.e., upon crossing the first line 144. Once reaching the second line 150, the medial side 118 bows outward, away from the longitudinal, central axis 120, at which point the medial side 118 extends into the heel region 112, i.e., upon crossing the second line 150. The medial side 118 then bows outward and then inward toward the heel end 146, and terminates at a point where the medial side 118 meets the longitudinal, central axis 120.

The lateral side 116 also begins at the distal, toe end 140 and bows outward along an outer side of the article of footwear 100 along the forefoot region 108 toward the midfoot region 110. The lateral side 116 reaches the first line 144, at which point the lateral side 116 bows inward, toward the longitudinal, central axis 120. The lateral side 116 extends from the first line 144, i.e., the widest portion 142, toward the second line 150, i.e., the thinnest portion 148, at which point the lateral side 116 enters into the midfoot region 110, i.e., upon crossing the first line 144. Once reaching the second line 150, the lateral side 116 bows outward, away from the longitudinal, central axis 120, at which point the lateral side 116 extends into the heel region 112, i.e., upon crossing the second line 150. The lateral side 116 then bows outward and then inward toward the heel end 146, and terminates at a point where the lateral side 116 meets the longitudinal, central axis 120.

Referring still to FIGS. 2 and 3, the upper 102 extends along the lateral and medial sides 116, 118, and across the forefoot region 108, the midfoot region 110, and the heel region 112 to house and enclose a foot of a user. When fully assembled, the upper 102 also includes an interior surface 152 and an exterior surface 154. The interior surface 152 faces inward and generally defines the interior cavity 106, and the exterior surface 154 of the upper 102 faces outward and generally defines an outer perimeter or boundary of the upper 102. The upper 102 also includes an opening 156 that is at least partially located in the heel region 112 of the article of footwear 100, which provides access to the interior cavity 106 and through which a foot may be inserted and removed. In some embodiments, the upper 102 may also include an instep region 158 that extends from the opening 156 in the heel region 112 over an area corresponding to an instep of a foot to an area proximate the forefoot region 108. The instep region 158 may comprise an area similar to where a tongue 160 (see FIG. 2) of the present embodiment is disposed. In some embodiments, the upper 102 does not include the tongue 160, i.e., the upper 102 is tongueless.

In the illustrated embodiment, the sole structure 104 includes a midsole 162 and an outsole 164. The outsole 164 may define a bottom end or bottom surface 166 of the sole structure 104 across the forefoot, midfoot, and heel regions 108, 110, 112. Further, the outsole 164 may be a ground-engaging portion or include a ground-engaging surface of the sole structure 104 and may be opposite of the insole thereof. As illustrated in FIG. 1, the bottom surface 166 of the outsole 164 may include a tread pattern 168 that can include a variety of shapes and configurations. The outsole 164 may be formed from one or more materials to impart durability, wear-resistance, abrasion resistance, or traction to the sole structure 104. In some embodiments, the outsole 164 may be formed from any kind of elastomer material, e.g., rubber, including thermoset elastomers or thermoplastic elastomers, or a thermoplastic material, e.g., thermoplastic polyurethane (TPU). In some embodiments, the outsole 164 may define a shore A hardness up to 95. In addition, the outsole 164 may be manufactured by a process involving injection molding, vulcanization, printing layer by layer, i.e., additive manufacturing systems or methods, and the like.

Still referring to FIG. 1, the midsole 162 may be individually constructed from a thermoplastic material, such as polyurethane (PU), for example, and/or an ethylene-vinyl acetate (EVA), copolymers thereof, or a similar type of material. In other embodiments, the midsole 162 may be an EVA-Solid-Sponge ("ESS") material, an EVA foam (e.g., PUMA® ProFoam Lite™, IGNITE Foam), polyurethane, polyether, an olefin block copolymer, organosheets, a thermoplastic material (e.g., a thermoplastic polyurethane, a thermoplastic elastomer, a thermoplastic polyolefin, etc.), or a supercritical foam. The midsole 162 may be a single polymeric material or may be a blend of materials, such as an EVA copolymer, a thermoplastic polyurethane, a polyether block amide (PEBA) copolymer, and/or an olefin block copolymer. One example of a PEBA material is PEBAX®. In some embodiments, the midsole 162 is manufactured by a process involving injection molding, vulcanization, printing layer by layer, i.e., additive manufacturing systems or methods, and the like.

In embodiments where the midsole 162 is formed from a supercritical foaming process, the supercritical foam may comprise micropore foams or particle foams, such as a TPU, EVA, PEBAX®, or mixtures thereof, manufactured using a process that is performed within an autoclave, an injection molding apparatus, or any sufficiently heated/pressurized container that can process the mixing of a supercritical fluid (e.g., $CO_2$, $N_2$, or mixtures thereof) with a material (e.g., TPU, EVA, polyolefin elastomer, or mixtures thereof) that is preferably molten. During an exemplary process, a solution of supercritical fluid and molten material is pumped into a pressurized container, after which the pressure within the container is released, such that the molecules of the supercritical fluid rapidly convert to gas to form small pockets within the material and cause the material to expand into a foam. In further embodiments, the midsole 162 may be formed using alternative methods known in the art, including the use of an expansion press, an injection machine, a pellet expansion process, a cold foaming process, a compression molding technique, die cutting, or any combination thereof. For example, the midsole 162 may be formed using a process that involves an initial foaming step in which supercritical gas is used to foam a material and then compression molded or die cut to a particular shape.

In some embodiments, the article of footwear 100 may include one or more visual display systems arranged on one or more components of the article of footwear 100, such as, e.g., the upper 102. Examples of such visual display systems or technologies may be optoelectronic displays that include, but are not limited to: electrochemical transistor based visual display technologies, liquid crystal display (LCD) panel technologies, light-emitting diode (LED) screen technologies, fiber optic technologies, electrochromographic materials (including photonic lattices or crystals), electronic paper technologies (including electrophoretic ink technologies, electrowetting technologies, or electrofluidic technologies), electroluminescent strip technologies, as well as other visual display technologies. In some embodiments, visual display portions of a display system of an article of footwear can be associated with electronic paper technologies utilizing electrophoretic ink. Several examples of such technologies are disclosed in any of the following, each of which is hereby incorporated by reference in their entirety: U.S. Pat. Nos. 7,535,624; 7,528,822; 7,420,549; 7,167,155; 7,201,952; 6,987,603; 6,922,276; and 6,864,875.

In some embodiments, visual display portions of a display system of an article of footwear can be associated with flexible electronic paper technologies using electrophoretic ink, which may retain a visual display following removal of an applied power source. Several examples of such technologies are disclosed in any of the following, each of which is hereby incorporated by reference in their entirety: U.S. Pat. Nos. 8,502,788; 7,944,597; 7,675,672; 7,195,170; and 6,936,190. In some embodiments, visual display portions of a display system of an article of footwear can be associated with electronically controllable visually dynamic textiles or flexible substrates that may form portions of the article of footwear. Examples of such technologies are disclosed in U.S. Patent Publication No. 2003/0224155, the entirety of which is hereby incorporated by reference.

Figure 4:
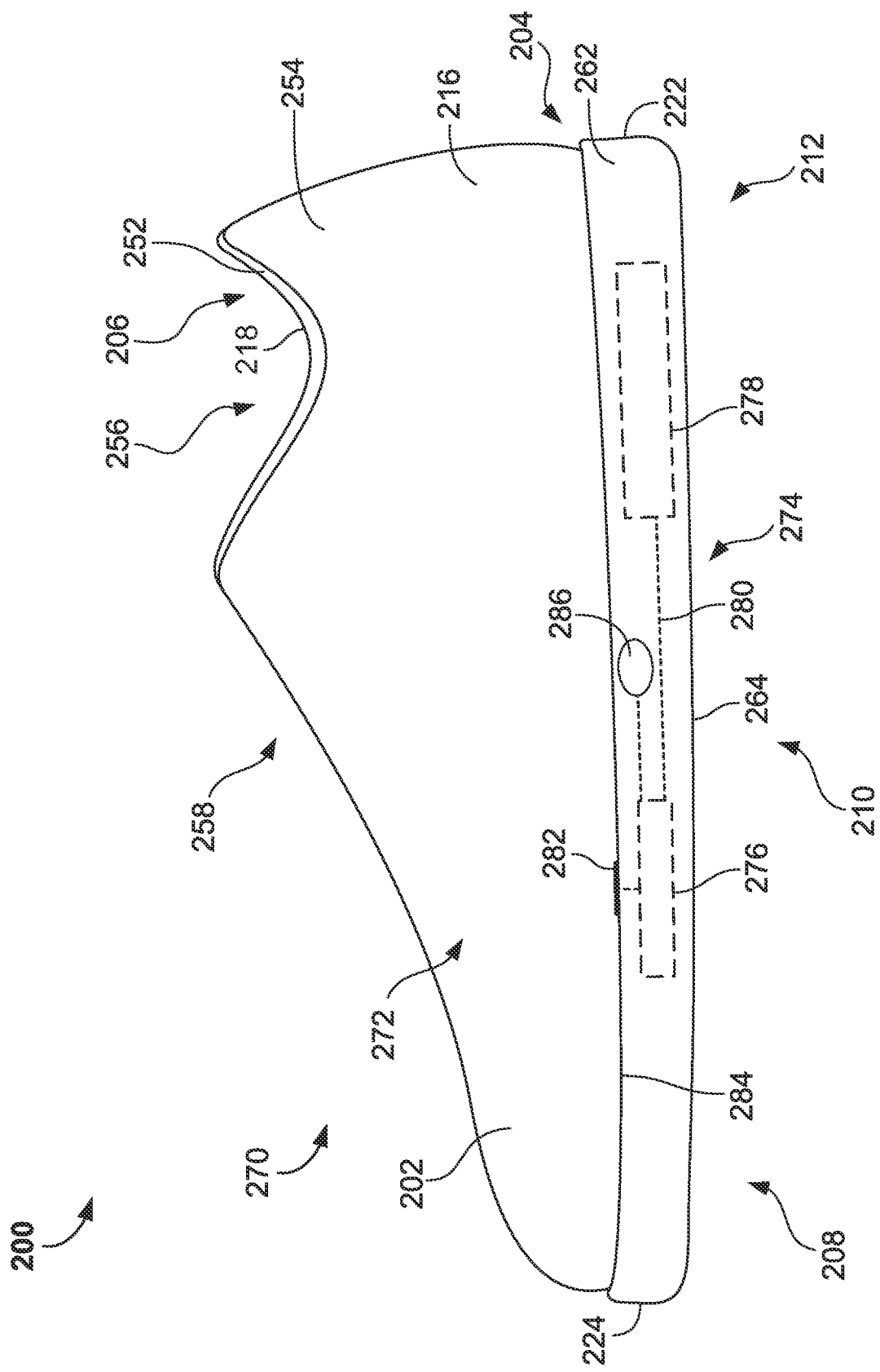
FIG. 4 is a lateral side view of an article of footwear configured as a left shoe with a display system, according to an embodiment of the disclosure.

Turning to FIG. 4, an exemplary article of footwear 200 is shown, which includes an upper 202 attached to a sole structure 204 and a display system 270. The article of footwear 200 is similar to the previous embodiment, with like elements being indicated by similar reference numerals under the "2xx" series of reference numerals. For example, the article of footwear 200 includes the sole structure 204 that includes a midsole 262 and an outsole 264, just as the article of footwear 100 includes the sole structure 104 with the midsole 162 and the outsole 164 (see FIG. 1).

The display system 270 of the article of footwear 200 includes a display device 272 configured to be visible from an exterior of the footwear 200 and a circuit 274 configured to provide electrical signals to the display device 272. In the illustrated embodiment, the circuit 274 includes a control module 276 and a power source 278, each in electrical communication with the display device 272 via conductive leads 280. The control module 276 and the power source 278 are configured to communicate with the display device 272 via the conductive leads 280. In some embodiments, the circuit 274 may be disposed or retained within the sole structure 204. For example, in some embodiments, the power source 278 may be embedded within or disposed between layers of the sole structure 204, such as, e.g., the midsole 262. In some embodiments, the control module 276 is embedded within or disposed between layers of the sole structure 204, such as, e.g., the midsole 262. In some embodiments, at least the power source 278 may be arranged substantially within the heel region 212 of the sole structure 204 (as shown in FIG. 4). In some embodiments, the conductive leads 280 may extend through one or more layers of the sole structure 204 and into contact with or along the upper 202.

Still referring to FIG. 4, the display device 272 may include an electrical contact 282 disposed along a periphery 284 of the upper 202, e.g., an edge or boundary where the upper 202 and the sole structure 204 are joined together. In some embodiments, the display system 270 can be configured such that the entire periphery 284 functions as the electrical contact 282. In some embodiments, the display system 270 can be configured such that a portion or discrete segments of the periphery 284 function as the electrical contact 282. In some embodiments, the electrical contact 282 is attached between the upper 202 and the sole structure 204 separately and spaced apart from the periphery 284. In some embodiments, the electrical contact 282 can be arranged along one or more of a lateral side 216, a medial side 218, or an instep region 258 of the upper 202. In some embodiments, the electrical contact 282 may be arranged along one or more portions of the upper 202, such as, e.g., a contact pad or receptacle, and the display device 272 can be removably attached to the one or more portions of the upper 202 having the electrical contact 282.

The power source 278 may be a storage cell, such as, e.g., a battery or a capacitor. The power source 278 may be rechargeable via a mechanical connection port (not shown) that is accessible externally on the sole structure 204, such as, e.g., a USB or USB-C, Apple Lightning®, or any other suitable interface. In some embodiments, the power source 278 may be configured to be rechargeable wirelessly, without the use of any port, by proximity to a wireless charging pad or mat. The power source 278 may be Nickel-Cadmium (NiCd), Nickel-Metal Hydride (NiMH), Lithium Ion (Li-ion), lead acid, or the like. In some embodiments, the power source 278 includes a piezoelectric device that is configured to convert kinetic energy into electrical energy for powering or controlling the display device 272. In some embodiments, the power source 278 includes a plurality of storage cells and/or piezoelectric devices. In some embodiments, the power source 278 is removably attached to or arranged within the sole structure 204 of the footwear 200, such that the power source 278 may be removed, such as, e.g., through an opening (not shown) in the sole structure 204 or an opening 256 of the upper 202. In some embodiments, the control module 276 includes the power source 278.

The control module 276 is provided to generally control the display device 272. For example, the control module 276 may be configured to send electrical signals in the form of changes in current and/or voltage levels to the display device 272. In some embodiments, the control module 276 is a switch or a switch matrix that can be configured to selectively intervene between the power source 278 and the display device 272. In some embodiments, the control module 276 is configured for binary operation, such that the display device 272 may either receive power or may not receive power from the power source 278. In some embodiments, the control module 276 is capable of modulation, such that the display device 272 may receive a full amount of power, a minimum amount of power, and one or more intermediate levels of power therebetween from the power source 278. In some embodiments, the control module 276 is configured for selective control of portions of the display device 272, such that portions of the display device 272 may receive power while other portions of the display device 272 may not receive power. To that end, the control module 276 may be a central processing unit (CPU), a printed circuit board (PCB), a flexible circuit board, or the like. In some embodiments, a plurality of control units is provided for selective control of the entire display device 272 or of portions of the display device 272.

With continued reference to FIG. 4, the control module 276 may be configured to receive input signals from at least one input device 286 of the display system 270. The input device 286 may be any suitable type of sensor or actuator for communicating with the control module 276 to selectively or automatically control the display device 272. In some embodiments, the input device 286 can be a touch-activated sensor (not shown) configured such that a user's finger can slide or tap an external surface of the input device 286 to control the display device 272. Touch-activated sensors of various types are contemplated, including a capacitive touch slide sensor, a capacitive touch tap sensor, a resistive touch slide sensor, or a resistive touch tap sensor. In some embodiments, the input device 286 can be a microphone such that sound waves of various frequencies may be detected for control of the display device 272 via the control module 276. For example, in such embodiments, the input device 286 may be capable of voice-activation by which a user's speech can dictate "on" or "off" for controlling the display device 272. In some embodiments, the input device 286 of the display system 270 is external to the article of footwear 200 and, instead, the input device 286 is included in a smartphone, tablet, laptop, smartwatch or wearable electronic, special-purpose computer or device, or the like. For example, the user may access a mobile application via a smartphone for communication over a wireless communication network with the control module 276. In such embodiments, the control module 276 includes a wireless transceiver operating over a short-range wireless communication network, such as, e.g., a Wi-Fi connection, a Bluetooth® connection, a radio frequency identification (RFID) or near-field communication (NFC) connection, or the like, and the user may control the display device 272 of the article of footwear 200 wirelessly via a mobile application or widget on a display screen of the smartphone.

The display device 272 may be provided as one or more portions of the upper 202 and/or sole structure 204 of the article of footwear 200 in various configurations. In some embodiments, the display device 272 may be provided as a discrete panel or segment that is applied to a portion of the upper 202. In some embodiments, the display device 272 is permanently attached to the upper 202, such as, e.g., by adhesive, fastening, welding, knitting or weaving, molding, or the like. In some embodiments, the display device 272 is removably attached to the upper 202 such as, e.g., by fasteners, magnetic elements, adhesives, or the like. In some embodiments, the display device 272 comprises at least a portion of an outer layer (not shown) of the upper 202 that at least partially defines the exterior surface 254 of the upper 202 and that is adjacent to an inner layer (not shown) of the upper 202 that at least partially defines the interior surface 252 of the upper 202. In some embodiments, the display device 272 comprises at least a portion of a tongue (not shown) of the upper 202. In some embodiments, the display device 272 comprises a portion of the sole structure 204, such as, e.g., along the lateral and/or medial sides 216, 218 of the midsole 262.

As illustrated in FIG. 4, the display device 272 is arranged along or integrally formed with the upper 202 of the article of footwear 200 from the distal end 224 to the proximal end 222 and across the medial side 218 to the lateral side 216 of the upper 202. In some embodiments, the display device 272 is disposed within two or more of the forefoot, midfoot, and heel regions 208, 210, 212 and along one or both of the lateral and medial sides 216, 218 of the upper 202. In some embodiments, the display device 272 is disposed within only one of the forefoot region 208, the midfoot region 210, or the heel region 212. In some embodiments, the display device 272 is arranged along the instep region 258 of the upper 202 from the distal end 224 to the opening 256 of the upper 202. In some embodiments, the display device 272 can be disposed in one or more portions of the sole structure 204. For example, in some embodiments, the display device 272 can be arranged in the midsole 262 adjacent to the outsole 264, which can have one or more transparent portions, such that the display device 272 is visible from an exterior of the article of footwear 200 along one or more of the lateral side 216, the medial side 218, the proximal end 222, or the distal end 224 of the midsole 262 or from the bottom of the article of footwear 200 along the transparent outsole 264. In some embodiments, the display device 272 can be integrally formed with the outsole 264 of the sole structure 204. In some embodiments, the display system 270 can include two or more display devices 272 disposed along distinct portions of the upper 202 and/or other portions of the article of footwear 200, such as, e.g., the sole structure 204.

As briefly mentioned above, the display device 272 may include an optoelectronic display technology, such as, e.g., electrophoretic ink. That is, the display device 272 may incorporate electronic paper technologies, including flexible electronic paper technologies, that provide an optoelectronic display while maintaining the comfort, durability, and lightweight properties of the upper 202. In some embodiments, the display device 272 includes a substrate in the form of a thin film transistor (TFT), preferably a flexible TFT, which is a field-effect transistor configured to function as a switch for one or more portions or segments of the display device 272. In some embodiments, the display device 272 may comprise rigid portions or segments that include a rigid TFT. In some embodiments, the substrate is comprised of an organic TFT made from organic semiconducting compounds. In some embodiments, the control module 276 can include a transistor configured to function as a switch for one or more portions or segments of the display device 272. In a preferred embodiment, the display device 272 is passively operated, in that the display device 272 draws power only when changing a visual characteristic thereof such that no further power is drawn or required to sustain the visual characteristic on the display device 272. In some embodiments, a visual characteristic of the display device 272 can be a color, a luminous intensity, a resolution, a gloss unit, and the like. In some embodiments, the display device 272 can be configured to display a static image, animation, text, symbols, logos, or the like, and the visual characteristic can be a particular static image, animation, text, symbols, logos, or the like. In some embodiments, the display device 272 is provided with a surface treatment, such as, e.g., an anti-glare treatment or coating, a moisture barrier, a scratch barrier or other protective coatings, and the like.

As also briefly mentioned above, the display system 270 may be configured such that the display device 272, or a visual characteristic thereof, is controllable based on one or more inputs from the input device 286 that are received by the control module 276. Relatedly, in some embodiments, the control module 276 may be configured to automatically turn on/off or to automatically change between two or more states of one or more visual characteristics of the display device 272. For example, in some embodiments, the display device 272 may automatically change states based on one or more parameters determined by the control module 276, such as, e.g., upon expiration of a predetermined time period stored in the control module 276. In such embodiments, the one or more parameters determined by the control module 276 can be set by a user via the input device 286. In some embodiments, a user can customize or define the first and second states of the of the one or more visual characteristics of the display device 272 via the input device 286. In some embodiments, a user can turn on/off the display device 272 or can disable or enable automatic changing between two or more states of one or more visual characteristics of the display device 272 by the control module 276 via the input device 286.

In some embodiments, the input device 286 can be an electronic device external to the article of footwear 200 and the control module 276 can receive one or more inputs from the electronic device that correspond to one or more display configurations, such as, e.g., an artwork or a virtual object purchased or generated by the user, and can cause the one or more display configurations to be displayed on the display device 272. In such embodiments, the control module 276 can be further configured to communicate with a user's digital wallet via a user's electronic device, e.g., a smartphone or personal computing device, to display artwork that is authenticated by a non-fungible token (NFT) stored within or accessible through the user's digital wallet. In some embodiments, the control module 276 transmits a unique identification (unique ID) corresponding with the footwear, such as the UPIC or UPC, as part of a validation process associated with the use of the display device 272 to display the artwork authenticated by the NFT. For example, the NFT may be displayed only on certain footwear with certain unique IDs, such as the footwear worn by members of the same team or group.

Figure 5:
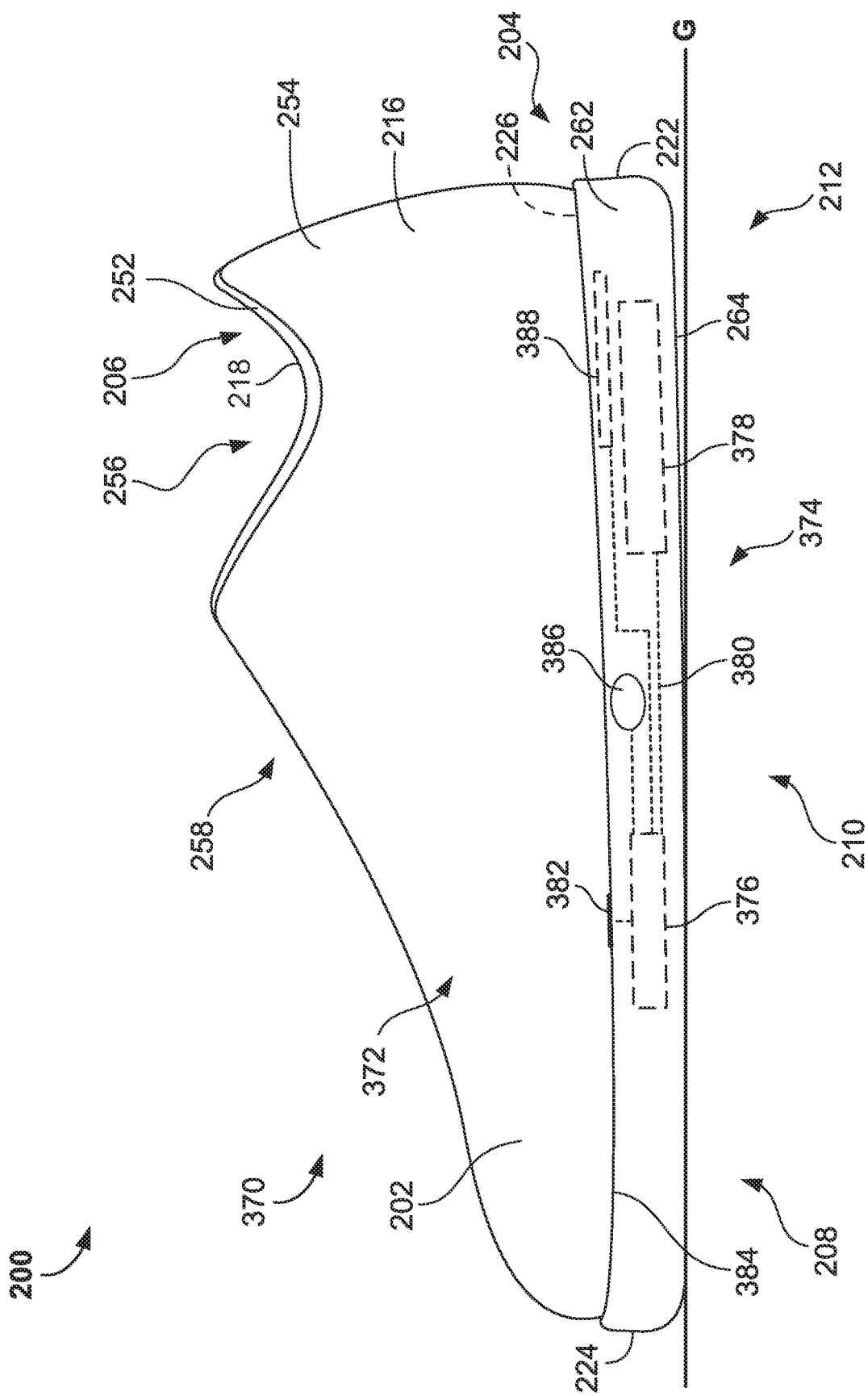
FIG. 5 is a lateral side view of the article of footwear of FIG. 4 in a first position and having another embodiment of a display system, according to aspects of the disclosure.
Figure 6:
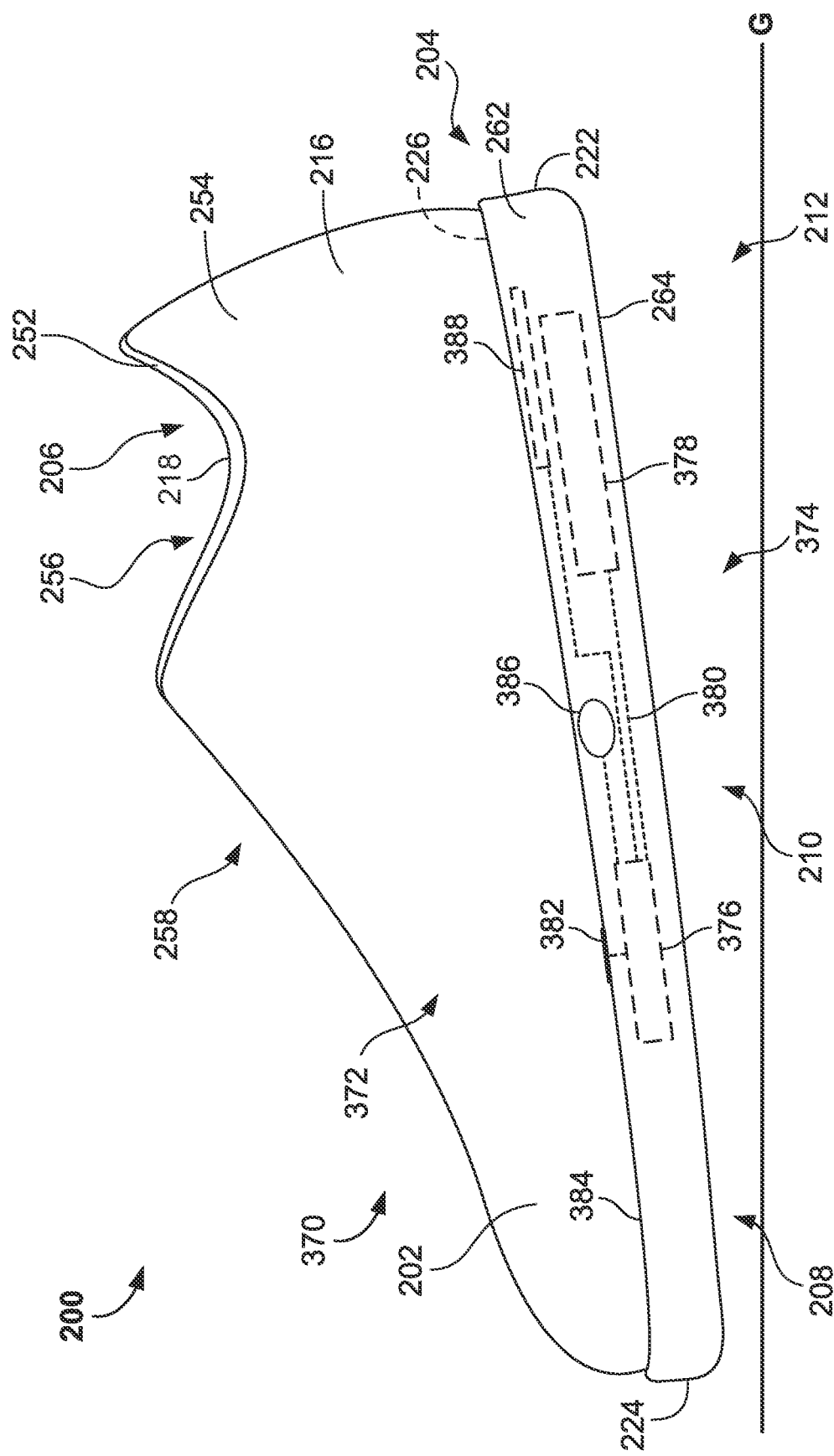
FIG. 6 is a lateral side view of the article of footwear of FIG. 5 in a second position.

It is contemplated that a display system of an article of footwear can be configured as a dynamic display system in which a visual characteristic of a display device of the display system can have one or more states that correspond to one or more measured motions while the article of footwear is worn by a user. In this regard, another exemplary embodiment of a display system 370 of the article of footwear 200 is depicted in FIGS. 5 and 6. The display system 370 is similar to the display system 270, with like elements being indicated by similar reference numerals under the "3xx" series of reference numerals. For example, the display system 370 includes a display device 372 in communication with a control module 376 and a power source 378 via conductive leads 380 of a circuit 374 in a similar manner as the display device 272 is in communication with the control module 276 and the power source 278 of the circuit 274 of the display system 270 of FIG. 4. Further, the display device 372 of the display system 370 can include an electrical contact 382 that can be disposed along a periphery 384 of the upper 202 in a similar manner as the electrical contact 282 of the display device 272 of the display system 270 of FIG. 4. While the display system 370 is similar to the display system 270 in many aspects, there are some aspects that differ. In particular, the circuit 374 of the display system 370 further includes at least one sensor 388 in electrical communication with the control module 376.

In the illustrated embodiment, the display system 370 of the article of footwear 200 is configured to display one or more states or configurations of one or more visual characteristics, such as, e.g., a color, a transparency, a gloss unit, a power level, or a pattern, of the display device 372 that can correspond to one or more dynamic characteristics, such as, e.g., motion, motion cycles, position, or proximity, of the article of footwear 200 while worn by a user. For example, in some embodiments, the display system 370 can be configured such that the display device 372 displays a first color when the article of footwear 200 has a first dynamic characteristic and can be automatically caused to display a second color that is different than the first color when the article of footwear 200 has a second dynamic characteristic that is different than the first dynamic characteristic. In some embodiments, the display system 370 can be configured such that the display device 372 displays a first pattern having a first power level or luminous intensity when the article of footwear 200 has the first dynamic characteristic and can be automatically caused to display a second pattern that is different than the first pattern, e.g., having a second power level or luminous intensity that is different than the first power level or luminous intensity, when the article of footwear 200 has the second dynamic characteristic.

More specifically, in the illustrated embodiment, the control module 376 is configured to cause the one or more states or configurations of the of the one or more visual characteristics of the display device 372 to change to a different state or configuration in response to one or more electrical signals received from the sensor 388 that can correspond to one or more measured dynamic characteristics of the article of footwear 200. For example, in some embodiments, the sensor 388 can be configured to measure one or more dynamic characteristics of the article of footwear 200 relative to a user's foot, such as, e.g., pressure, force, or strain exerted on the article of footwear 200 by a user's foot or an orientation, angle, velocity, or acceleration of the article of footwear 200 while worn by a user. In the illustrated embodiment, the sensor 388 is arranged adjacent to the insole 226 of the sole structure 204 and within the heel region 212 of the article of footwear 200. In some embodiments, the sensor 388 can be arranged on the upper 202 of the article of footwear 200. In some embodiments, the sensor 388 can be arranged in the forefoot region 208 or the midfoot region 210 of the article of footwear 200. In other embodiments, the sensor 388 can extend in two or more of the forefoot, midfoot, or heel regions 208, 210, 212. In some embodiments, the sensor 388 can be configured to be flexible or deformable when the upper 202 or the sole structure 204 deform during normal use of the footwear 200, e.g., throughout a gait cycle of the user.

In some embodiments, the display system 370 can include two or more sensors 388 each in electrical communication with the control module 376 and arranged in one or more of the forefoot, midfoot, and heel regions 208, 210, 212 of the footwear 200. For example, in such embodiments, a first sensor 388 can be arranged in the heel region 212 of the sole structure 204 and a second sensor (not shown) can be arranged in the forefoot region 208 of the sole structure 204. In some embodiments, at least one of the two or more sensors 388 can be arranged within the midsole 262 of the sole structure 204. In some embodiments, at least one of the two or more sensors 388 can be arranged along one or more portions of the upper 202. For example, in such embodiments, at least one sensor of the two or more sensors 388 can be arranged along the instep region 258 of the upper 202. In some embodiments, the control module 376 can include the sensor 388. In some embodiments, the sensor 388 can be external to the article of footwear 200. For example, in such embodiments, the sensor 388 can be included in an electronic device of the user, such as, e.g., a smartphone or a wearable device, that is in wireless communication with the control module 376.

Figure 7:
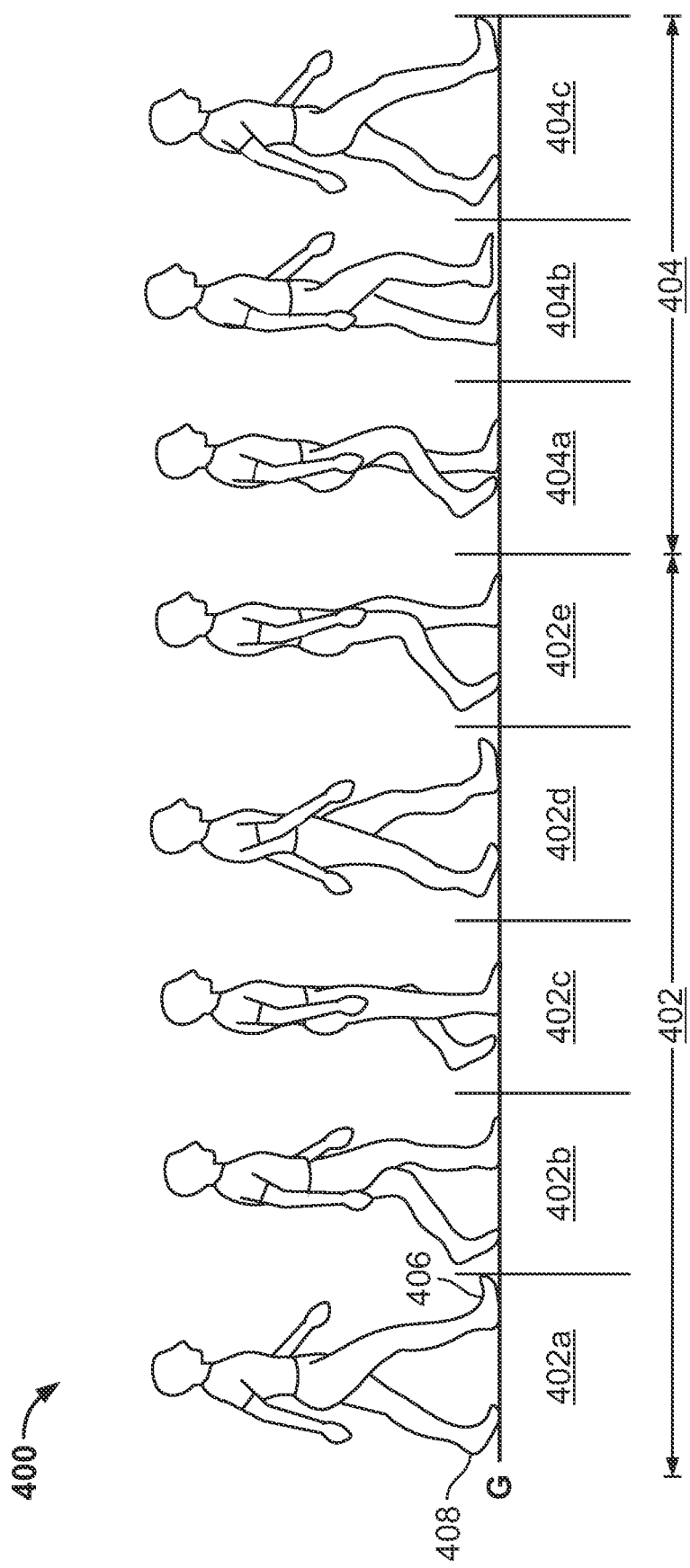
FIG. 7 is an illustration of a gait cycle of a user of an article of footwear, such as the article of footwear of FIG. 5.

Referring to FIGS. 5-7, a particular example of a dynamic characteristic of the footwear 200 that may be measured by the sensor 388 and that may correspond to one or more states or configurations of one or more visual characteristics of the display device 372 of the display system 370 may be one or more phases of a user's stride or gait cycle while wearing the footwear 200. A gait cycle is meant to refer to a series of phases that begin when a user's foot initially strikes a ground surface and until the same foot subsequently strikes the ground surface again, such as while a user is walking or running. For example, a particular gait cycle can begin when a user's right foot strikes or contacts a ground surface and can continue through a series of phases, including the user's right foot striking or contacting the ground surface, and until the user's right foot subsequently strikes or contacts the ground surface again. As shown in the diagram of FIG. 7, a gait cycle 400 can include two primary phases—a stance phase 402 and a swing phase 404—each having a plurality of subphases. Generally, the stance phase 402 corresponds to a user's motions taken while a reference or measured foot 406, i.e., one of a right foot or a left foot of the user, is in contact with a ground surface G, and the swing phase 404 corresponds to the user's motions taken while the reference foot 406 is lifted from the ground surface G and swung forwardly.

In the illustrated exemplary gait cycle 400 of FIG. 7, the stance phase 402, and thus the gait cycle 400, begins with a heel strike subphase 402a, in which a heel of the user's reference foot 406, i.e., a right foot in the example, strikes the ground surface G while a forefoot of the user's other foot 408, i.e., a left foot in the example, simultaneously contacts the ground surface. The heel strike subphase 402a is followed by a loading response subphase 402b, in which the reference foot 406 is generally flattened against the ground surface G as the user shifts their weight or load onto the reference leg with the knee slightly bent while the other foot 408 is partially lifted from the ground surface G, and then by a mid-stance subphase 402c, in which the user's knee of the reference leg is straightened and the other foot 408 is completely lifted from the ground surface G. The mid-stance subphase 402*c* is followed by a terminal stance subphase 402*d*, in which the other leg is swung forward with the heel of the other foot 408 striking the ground surface G while the heel of the reference foot 406 is lifted from the ground surface G. The terminal stance subphase 402*d* is followed by a pre-swing subphase 402*e*, in which the other foot 408 is flattened against the ground surface G while the knee of the reference leg is bent and the reference foot 406 is partially lifted such that the forefoot of the reference foot 406 still contacts the ground surface G, and which completes the stance phase 402 of the gait cycle 400.

Referring still to FIG. 7, from the pre-swing subphase 402*e* of the stance phase 402, the swing phase 404 begins with a toe-off subphase 404*a*, in which the reference foot 406 is completely elevated or lifted from the ground surface G, and is then followed by a mid-swing subphase 404*b*, in which the reference leg is swung forward with the right knee bent such that the reference foot 406 continues to be lifted from the ground surface G. The mid-swing subphase 404*b* is followed by a terminal swing subphase 404*c*, in which the reference leg is straightened and just prior to the heel of the reference foot 406 striking the ground surface G, and which completes the swing phase 404 and the gait cycle 400. As used herein, a step is intended to refer to contact of the reference foot 406 with the ground surface G until the other foot 408 contacts the ground surface G, and a stride is intended to refer to contact of the reference foot 406 with the ground surface G and until the reference foot 406 subsequently recontacts the ground surface G again.

With continued reference to FIG. 7, the subphases 402*a*, 402*b*, 402*c*, 402*d*, 402*e*, 404*a*, 404*b*, 404*c* of the gait cycle 400 may also correspond to one of three particular tasks that result in a stride of the user, including a weight acceptance task, a single-limb support task, and a limb advancement task. For example, the heel strike subphase 402*a* corresponds to the weight acceptance task, in which a weight of the user is initially transferred at least partially to the reference foot 406. The loading response, mid-stance, and terminal stance subphases 402*b*, 402*c*, 402*d* correspond to the single-limb support task, in which the weight of the user is supported solely by the reference foot 406. Finally, the pre-swing, toe-off, mid-swing, and terminal swing subphases 402*e*, 404*a*, 404*b*, 404*c* correspond to the limb advancement task, in which the weight of the user is initially partially transferred, and then fully transferred, to the other foot 408. It should be appreciated that a gait cycle similar to the gait cycle 400 of the reference foot 406 can be described with respect to the other foot 408.

Referring again to FIGS. 5 and 6, when the article of footwear 200 is worn by a user, the reference foot 406, e.g., a left foot, of the user is received within the interior cavity 206 of the upper 202 of the footwear 200 such that a bottom side or sole of the foot 406 contacts the insole 226 of the sole structure 204 (see, e.g., foot 128 in FIG. 3). Accordingly, while the footwear 200 is worn and throughout the gait cycle 400 of the user (see FIG. 7), the article of footwear 200 can be in one of the plurality of subphases 402*a*, 402*b*, 402*c*, 402*d*, 402*e* of the stance phase 402 (as shown in FIG. 5), in which at least a portion of the outsole 264 of the sole structure 204 contacts the ground surface G, or in one of the plurality of subphases 404*a*, 404*b*, 404*c* of the swing phase 404 (as shown in FIG. 6), in which the outsole 264 of the sole structure 204 does not contact the ground surface G.

Thus, in some embodiments, the sensor 388 can be configured to measure or sense a force or pressure exerted on the insole 226 of the sole structure 204, such as, e.g., a pressure sensor, pressure transducer, force sensor, or the like, and the control module 376 can be configured to cause the one or more visual characteristics of the display device 372 to be in one or more different states corresponding to the user's gait cycle 400 based on electrical signals received from the sensor 388. For example, during the stance phase 402 of the user's gait cycle 400, i.e., the weight acceptance task of the user's stride, the user's foot 406 exerts a first force or pressure on the insole 226 resulting from the user's weight at least partially shifted to the foot 406, which is counteracted by the sole structure 204 in contact with the ground surface G. In addition, depending on which of the subphases 402*a*, 402*b*, 402*c*, 402*d*, 402*e* of the stance phase 402 the user's foot 406 presently corresponds with, the first force may vary in degree and may be distributed along the entirety of the insole 226 of the sole structure 204 or exerted at one or more focal points along one or more portions of the insole 226. For example, during the heel strike subphase 402*a* or the terminal stance subphase 402*d* of the stance phase 402, the first force exerted on the insole 226 is focalized or concentrated along the heel region 212 or the forefoot region 208, respectively, of the sole structure 204, and during the mid-stance subphase 402*c*, the first force exerted on the insole 226 is distributed along each of the forefoot, midfoot, and heel regions 208, 210, 212 of the sole structure 204.

On the other hand, during each of the subphases 404*a*, 404*b*, 404*c* of the swing phase 404, the user's foot 406 exerts a second force or pressure on the insole 226 of the sole structure 204 that is less than the first force or pressure because the weight of the user is shifted to the other foot 408 and the sole structure 204 is not in contact with the ground surface G. Accordingly, in such embodiments, the control module 376 can be configured to determine whether the footwear 200 is in the stance phase 402 or the swing phase 404 of the user's gait cycle 400 based on signals received from the sensor 388 that correspond to measurements of pressure or force exerted on the insole 226 of the sole structure 204 of the footwear 200, and to cause the visual characteristic of the display device 372 to be in a first state during the stance phase 402 and a second state during the swing phase 404 of the user's gait cycle 400. In some embodiments, the display system 370 can be configured to display three or more states or configurations of one or more visual characteristics of the display device 372 that correspond to at least three of the subphases 402*a*, 402*b*, 402*c*, 402*d*, 402*e*, 404*a*, 404*b*, 404*c* of the user's gait cycle 400.

With continued reference to FIGS. 5-7, in some embodiments, the display system 370 of the footwear 200 can include a first pressure sensor arranged in the heel region 212 of the sole structure 204, such as, e.g., the pressure sensor 388, and a second pressure sensor (not shown) arranged in one or both of the forefoot region 208 and/or the midfoot region 210 of the sole structure 204. In such embodiments, the control module 376 can be configured to cause the visual characteristic of the display device 372 to be in a first state when a first signal is received from the first pressure sensor and a second state when a second signal is received from the second pressure sensor. For example, in such embodiments, a predetermined threshold force or pressure value can be stored in the control module 376 such that the control module 376 causes the visual characteristic of the display device 372 to change between the first and second states when the force or pressure measured by the first or second pressure sensors exceeds the threshold force or pressure value. In some embodiments, the control module 376 can be configured to determine whether the article of footwear 200 is in the stance phase 402 or the swing phase 404 of the user's gait cycle 400 based on a combination of first and second signals received from the first and second pressure sensors, and to cause the visual characteristic of the display device 372 to be in a first state during the stance phase 402 and a second state during the swing phase 404 of the user's gait cycle 400.

Referring still to FIGS. 5-7, in some embodiments, the sensor 388 of the display system 370 can be configured to measure velocity and/or acceleration of the footwear 200 throughout the user's gait cycle 400, such as, e.g., an accelerometer or a velocity sensor. For example, in such embodiments, the sensor 388 can be configured to sense or measure acceleration of the footwear 200 along the longitudinal axis 120 (see FIGS. 1-3) in a first or forward direction that is toward the distal end 224 of the footwear 200. As such, during the stance phase 402 of the user's gait cycle 400 (as shown in FIG. 5), the footwear 200 is in contact with the ground surface G and will have a first acceleration, i.e., no acceleration, and, during the swing phase 404 of the user's gait cycle 400 (as shown in FIG. 6), the footwear 200 is lifted from the ground surface G and swung in the forward direction such that the footwear 200 will have a second acceleration that is greater than the first acceleration. In such embodiments, the control module 376 can be configured to determine whether the article of footwear 200 is in the stance phase 402 or the swing phase 404 of the user's gait cycle 400 based on signals received from the sensor 388 that correspond to measurements of the acceleration of the article of footwear 200, and to cause the visual characteristic of the display device 372 to be in a first state during the stance phase 402 and a second state during the swing phase 404 of the user's gait cycle 400.

In some embodiments, the sensor 388 of the display system 370 can be configured to measure strain and/or tensile force on one or more portions of the upper 202 of the article of footwear 200 throughout the user's gait cycle 400, such as, e.g., a strain gauge or a force sensor. For example, in such embodiments, the sensor 388 can be configured to sense or measure strain and/or tensile force exerted on one or more portions of the upper 202 in one or more directions relative to the longitudinal axis 120 (see FIGS. 1-3) of the footwear 200 by a top or dorsal side of the user's foot 406. As such, during the stance phase 402 of the user's gait cycle 400 (as shown in FIG. 5), the footwear 200 is in contact with the ground surface G and a first strain and/or tensile force is exerted on the upper 202, and, during the swing phase 404 of the user's gait cycle 400 (as shown in FIG. 6), a second strain and/or tensile force that is greater than the first strain and/or tensile force will be exerted on one or more portions of the upper 202 because the footwear 200 is lifted from the ground surface G and at least a gravitational force pulls the footwear 200 downwardly relative to the top side of the user's foot 406. In such embodiments, the control module 376 can be configured to determine whether the article of footwear 200 is in the stance phase 402 or the swing phase 404 of the user's gait cycle 400 based on signals received from the sensor 388 that correspond to strain and/or tensile force exerted on the upper 202 of the footwear 200, and to cause the visual characteristic of the display device 372 to be in a first state during the stance phase 402 and a second state during the swing phase 404 of the user's gait cycle 400. In some such embodiments, the sensor 388, or portions thereof, can be arranged on or integrally formed with the upper 202 of the footwear 200.

Referring specifically to FIGS. 5 and 6, in some embodiments, the sensor 388 of the display system 370 can be configured to measure or sense intensity of ambient light surrounding the article of footwear 200, such as, e.g., a photoelectric device or photo sensor, and the control module 376 can be configured to cause the one or more visual characteristics of the display device 372 to be in one or more different states based on signals received from the sensor 388. For example, in such embodiments, the control module 376 can be configured to cause the display device 372 to have a first color or luminous intensity when a first signal corresponding to a sensed high intensity ambient light is received from the sensor 388 and to automatically change to a second color having more visibility than the first color and/or to increase the luminous intensity of the display device 372 when a second signal corresponding to a sensed low intensity ambient light is received from the sensor 388. Such embodiments can provide increased reflectiveness visibility of the footwear 200 to others and/or visibility of the ground surface G adjacent to the article of footwear 200 to the user in low intensity ambient light conditions.

In some embodiments, the sensor 388 of the display system 370 can be configured to measure or sense a distance traveled or a number of steps, strides, or gait cycles (see FIG. 7) taken by the user while wearing the article of footwear 200, such as, e.g., a pedometer, and the control module 376 can be configured to cause the one or more visual characteristics of the display device 372 to be in one or more different states based on signals received from the sensor 388. For example, in such embodiments, the control module 376 can be configured to cause the display device 372 to display a first color when a first signal corresponding to a measured distance or number of steps being within a first predetermined range is received from the sensor 388 and to automatically cause the display device 372 to display a second color when a second signal corresponding to the measured distance or number of steps being within a second predetermined range is received from the sensor 388. In such embodiments, the control module 376 can be configured to receive a user input, such as, e.g., via an input device 386 and/or an electronic device external to the footwear 200, such that a user can customize the corresponding values of the first and second predetermined ranges. In some embodiments, the control module 376 can be configured to cause the display device 372 to display text or graphs that correspond to a measured distance or number of steps based on signals received from the sensor 388.

In some embodiments, the sensor 388 of the display system 370 can be configured to measure or sense a degree or value in one or more directions of movement of the article of footwear 200, such as, e.g., a gyroscope, and the control module 376 can be configured to cause the one or more visual characteristics of the display device 372 to be in one or more different states based on signals received from the sensor 388. For example, in such embodiments, the control module 376 can be configured to determine a degree or value of one or more movements of the footwear 200 that can correspond to a particular activity or sport, such as, e.g., basketball, based on signals received from the sensor 388. In some embodiments, the control module 376 can be further configured to determine one or more performance statistics of the user participating in the activity or sport, such as, e.g., steps, pivots or cuts, a gravitational force equivalent (G-force), speed, acceleration, jump height, or jump force, based on the determined degree or value of the one or more movements. In such embodiments, the control module 376 can be still further configured to cause the display device 372 to display text, graphs, or artwork that can correspond to the determined one or more performance statistics of the user. For example, in such embodiments, the control module 376 can be configured to generate attributes or characteristics of an artwork displayed on the display device 372 based on the determined performance statistics, such as, e.g., by including or being in communication with a neural network, text-to-image generator, or application programming interface (API). The artwork or digital image generated by the control module 376 may then be linked to a user's device or computing system, such as by wireless or wired communication, and the user may mint an NFT to authenticate the artwork or digital object based on the determined performance statistics. The NFT may be minted on a public, permissionless blockchain network, such as, e.g., Ethereum, or on a private blockchain network. In some instances, the NFT may comply with the Ethereum Request for Comments (ERC) 721 or 1155 standards.

In some embodiments, the sensor 388 of the display system 370 can be configured to be in electrical or other communication with another sensor external to the article of footwear 200, such as, e.g., a laser receiver, to measure a characteristic, such as, e.g., a location or orientation, of the article of footwear 200 relative to the external sensor, such as, e.g., a laser receiver, that may be associated with one or more objects and the control module 376 can be configured to cause the one or more visual characteristics of the display device 372 to be in one or more different states based on signals received from the sensor 388. For example, in such embodiments, the external sensor can be a laser transmitter that transmits a laser extending linearly along an axis from the transmitter, and the control module 376 can be configured to determine a location of the article of footwear 200 relative to the laser axis from the transmitter based on signals received from the sensor 388. In such embodiments, the control module 376 can be further configured to cause the display device 372 to display one or more visual characteristics that can correspond to the determined location of the article of footwear 200 relative to the object or location corresponding to the laser line transmitter. For example, in such embodiments, the laser transmitter can be associated with a particular yard line on a sports playing field, such as, e.g., a line of scrimmage or a goal line of an American football field or a location corresponding to an offsides infraction on a soccer pitch, and the display device 372 can display a first visual characteristic, such as, e.g., a color green, when a user's foot wearing the article of footwear 200 on the playing field is located on a first side of the yard line, and can display a second visual characteristic, such as, e.g. a color red, when the user's foot crosses the yard line from the first side to a second side of the yard line.

In some embodiments, the sensor 388 of the display system 370 can be configured to measure or sense an orientation of the article of footwear 200 relative to a surface or an axis relative to the footwear 200, such as, e.g., a gyroscope, and the control module 376 can be configured to cause the one or more visual characteristics of the display device 372 to be in one or more different states based on signals received from the sensor 388. For example, in such embodiments, the control module 376 can be configured to determine an orientation of the article of footwear 200 relative to the ground surface G based on signals received from the sensor 388 and to cause the display device 372 to display one or more text, graphics, or icons in a first perspective or orientation when the footwear 200 is in a first orientation and in a second perspective or orientation when the footwear 200 is in a second orientation. For example, in such embodiments, the control module 376 can be configured to generate or receive one or more unique IDs, such as, e.g., a barcode or a QR code, and the display device 372 can display the one or more unique IDs in a first orientation when the footwear 200 is in a first orientation and in a second orientation when the footwear 200 is in a second orientation. In such embodiments, the display system 370 of the footwear 200 can provide improved readability of the one or more unique IDs displayed on the display device 372 relative to a person or object in proximity of the footwear 200. For example, in such embodiments, the unique ID displayed on the display device 372 of the footwear 200 can correspond to a ticket for entry into an event and the unique ID can be scannable or readable by a unique ID scanner to authenticate such unique ID displayed on the display device 372 while a user of the footwear 200 continuously walks by the unique ID scanner.

In some embodiments, the sensor 388 of the display system 370 can be configured to measure or sense a relative position or a geographical location of the article of footwear 200, such as, e.g., a global positioning system (GPS) sensor, and the control module 376 can be configured to cause the one or more visual characteristics of the display device 372 to be in one or more different states based on signals received from the sensor 388. For example, in such embodiments, the control module 376 can be configured to continuously or periodically track a geographical position of the footwear 200 based on signals received from the sensor 388 and to cause the display device 372 to display a graph or map corresponding to a present and/or past location of the footwear 200. In some embodiments, the display system 370 is configured to display a compass thereon, such that the sensor 388 of the article of footwear 200 can detect the Earth's natural magnetic field or the magnetic field of any surrounding environment. In some embodiments, the control module 376 can be further configured to receive a user input that indicates or sets a departure location and/or a destination location and to cause the display device 372 to display a map or one or more icons, such as, e.g., a directional arrow, indicating a present position of the footwear 200 relative to the departure and/or destination locations based on signals received from the sensor 388. In such embodiments, the control module 376 can be further configured to cause the display device 372 to display a first visual indicator, e.g., a first pre-determined color, when a user is on track toward the set destination location and a second visual indicator that is different than the first visual indicator, e.g., a second pre-determined color and/or a directional arrow to guide the user toward the destination location, when the user veers off track to the set destination location. In some embodiments, the sensor 388 may be configured to interact or communicate with a geofence, i.e., a virtual boundary setup around a particular geographical location. The sensor 388 may communicate with the geofence through, e.g., GPS, RFID, Wi-Fi, or cellular data to trigger some pre-determined action or notification. For example, when the sensor 388 detects entry into a geofenced area, the control module 376 may cause the display device 272 to display a first pre-determined color, image, text, or the like. Further, when the sensor 388 detects departure from or intersection with the virtual boundary of the geofenced area, the control module 376 may cause the display device 272 to display a second pre-determined color, image, text, or the like.

In some embodiments, the sensor 388 of the display system 370 can be configured to communicate with a transmitter or transceiver of an object, such as, e.g., an article of clothing, other footwear, sporting goods, appliances, televisions, smartphones, vehicles, alarm systems, or the like, and the control module 376 can be configured to determine one or more spatial relationships between the article of footwear 200 and the object based on signals received from the transmitter or receiver via the sensor 388. For example, in such embodiments, the sensor 388 communicates with a transmitter or transceiver on a golf club or a golf ball and the control module 376 is configured to determine an alignment or position of the footwear 200, such as, e.g., along the longitudinal axis 120 (see FIGS. 1-3) or from the distal end 224, relative to the golf club or golf ball and to cause the display device 372 to display a predetermined color, image, or text for indicating proper stance or alignment of the footwear 200 with the golf club and the golf ball or for indicating a distance or angle of the footwear 200 from the golf club and golf ball.

Still referring to FIGS. 5 and 6, in some embodiments, the sensor 388 of the display system 370 can be configured to measure or sense proximity of a moving or stationary object, such as, e.g., an automobile or a pedestrian, relative to the article of footwear 200 in one or more directions, such as, e.g., an infrared sensor or a proximity sensor, and the control module 376 can be configured to cause the one or more visual characteristics of the display device 372 to be in one or more different states based on signals received from the sensor 388. For example, in such embodiments, the control module 376 can be configured to cause the display device 372 to display a first color or icon when a first signal corresponding to a first measured proximity or distance of the object is within a first predetermined range is received from the sensor 388 and to automatically cause the display device 372 to display a second color or icon when a second signal corresponding to the measured proximity or distance being within a second predetermined range is received from the sensor 388. In some embodiments, the control module 376 can be configured to cause the display device 372 to display a graph, a map, or text corresponding to a present measured proximity or distance of the object relative to the footwear 200 based on signals received from the sensor 388.

In some embodiments, the article of footwear 200 having the display system 370 can be a first article of footwear of a pair of footwear, i.e., a left shoe and a right shoe, that further includes a second article of footwear having a second display system similar to the display system 370 of the article of footwear 200. In such embodiments, the display systems of the pair of articles of footwear can be configured to be in communication with one another such that the display device of the first article of footwear can have a visual characteristic that is the same as or different than a visual characteristic of the display device of the second article of footwear. For example, in some embodiments, control modules of the display systems of the pair of footwear can be in wireless communication with each other and can be configured to change one or more states or configurations of visual characteristics of a display device based on signals received from the control module of the other article of footwear. In some embodiments, one or both sensors of the display systems of the pair of footwear can be configured to measure a parameter of the other article of footwear, such as, e.g., a proximity or a relative location of the other article of footwear and/or a gait cycle phase of the other foot received within the other article of footwear. For example, in such embodiments, at least the sensor of the first article of footwear can be configured to determine a relative position of the second article of footwear.

In some embodiments, the sensors of the pair of footwear can be configured to interact with one another, e.g., electromagnetically or the like, in order to indicate a relative position or proximity of the pair of footwear. For example, in some embodiments, a sensor of the first article of footwear can be configured to produce a magnetitic field and the sensor of the second article of footwear can be a switch that is configured to be attracted to the magnetic field of the first article of footwear such that the switch is moveable to a first position when the first article of footwear swings past in a first direction and to a second position when the first article of footwear swings past in a second direction that is generally opposite the first direction. In such embodiments, each of the pair of footwear can include both a first sensor configured to produce a magnetic field and a second sensor configured as a switch.

Referring to FIGS. 4-6, various components of the example article of footwear 200, including one or more components or structures of the display systems 270, 370, may be formed through additive manufacturing techniques, such as three-dimensional (3D) printing. To that end, a number of 3D printing techniques may be implemented to form the article of footwear 200 having the display systems 270, 370, such as vat photopolymerization, material jetting, binder jetting, powder bed fusion, material extrusion, directed energy deposition, and/or sheet lamination. In some embodiments, the upper 202 having the display device 272 may be 3D printed as a single unitary piece. In other embodiments, portions of the display device 272 may be 3D printed separate from and later coupled to the upper 202. In some embodiments, one or components of the article of footwear 200 can be 3D printed with one or more components of the display system 270 encapsulated therein. For example, the sole structure 204 of the article of footwear 200 can be partially 3D printed, the control module 276 of the display system 270 can be arranged within the partially 3D printed sole structure 204, and then the sole structure 204 can be fully 3D printed with the control module 276 encapsulated within the sole structure 204.

In other embodiments, other configurations are possible. For example, certain features and combinations of features that are presented with respect to particular embodiments in the discussion above can be utilized in other embodiments and in other combinations, as appropriate. Further, any of the embodiments described herein may be modified to include any of the structures or methodologies disclosed in connection with other embodiments. Additionally, the present disclosure is not limited to articles of footwear of the type specifically shown. Still further, aspects of the articles of footwear of any of the embodiments disclosed herein may be modified to work with any type of footwear, apparel, or other athletic equipment.

As noted previously, it will be appreciated by those skilled in the art that while the disclosure has been described above in connection with particular embodiments and examples, the disclosure is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the disclosure are set forth in the following claims.

INDUSTRIAL APPLICABILITY

Numerous modifications to the present disclosure will be apparent to those skilled in the art in view of the foregoing description. Accordingly, this description is to be construed as illustrative only and is presented for the purpose of enabling those skilled in the art to make and use the disclosure. The exclusive rights to all modifications which come within the scope of the appended claims are reserved.

We claim:

1. A display system for an article of footwear, the display system comprising:
   a display device with an optoelectronic display that includes electrophoretic ink;
   a control module that is configured to communicate with the display device; and
   a power source, wherein a visual characteristic of the display device is configured to correspond with a gait cycle of a user wearing the article of footwear,
   wherein the gait cycle includes a stance phase, in which the article of footwear contacts a ground surface, and a swing phase, in which the article of footwear does not contact the ground surface,
   wherein the stance phase includes at least two subphases,
   wherein the visual characteristic includes at least two different states that correspond with the at least two subphases of the stance phase, and
   wherein the visual characteristic is at least one of: a symbol, text, an image, or an animation.

2. The display system of claim 1, wherein the visual characteristic is further comprising at least one of: a color, a transparency, a gloss unit, a power level, or a pattern.

3. The display system of claim 1, wherein the electrophoretic ink is integrally formed with an upper of the article of footwear.

4. The display system of claim 1, wherein the display device is arranged on an upper of the article of footwear.

5. An article of footwear, comprising:
   a sole attached to an upper; and
   a display system, including:
      a display device with an optoelectronic display that includes electrophoretic ink, the display device being arranged on the upper;
      a control module that is configured to communicate with the display device;
      a power source; and
      a sensor in electrical communication with the control module,
   wherein a visual characteristic of the display device is configured to correspond with a gait cycle of a user wearing the article of footwear,
   wherein the gait cycle includes a stance phase, in which the article of footwear contacts a ground surface, and a swing phase, in which the article of footwear does not contact the ground surface,
   wherein the control module is configured to, in response to signals received from the sensor, cause the display device to change between one or more different states,
   wherein the sensor is configured to be deformable when the upper deforms throughout the gait cycle,
   wherein the stance phase includes at least two subphases,
   wherein the visual characteristic includes at least two different states that correspond with the at least two subphases of the stance phase, and
   wherein the visual characteristic is at least one of: a symbol, text, an image, or an animation.

6. The article of footwear of claim 5, wherein the control module is disposed within a midsole of the sole.

7. The article of footwear of claim 5, wherein the electrophoretic ink is integrally formed with the upper.

8. The article of footwear of claim 5, wherein the sensor is configured to measure at least one of the following of the article of footwear: a number of gait cycles taken, a velocity, an acceleration, or an intensity of ambient light.

9. The article of footwear of claim 5, wherein the sensor is external to the article of footwear.

10. The article of footwear of claim 5, wherein the sensor is arranged in the sole of the article of footwear.

11. The article of footwear of claim 10, wherein the sensor is configured to measure pressure exerted on an insole of the sole.

12. The article of footwear of claim 5, wherein the article of footwear is a first article of footwear of a pair of footwear, the display system is a first display system, the control module is a first control module, and the visual characteristic of the first display system is a first visual characteristic that is configured to correspond with a gait cycle of a first foot of the user,
   wherein the pair of footwear further includes a second article of footwear that comprises a second display system, and
   wherein a second visual characteristic of the second display system is configured to correspond with a gait cycle of a second foot of the user.

13. The article of footwear of claim 12, wherein the second article of footwear further comprises a second control module, and
   wherein the first and second control modules are configured to be in electrical communication with an electronic device external to the pair of footwear.

14. A display system for an article of footwear, the display system comprising:
   a display device that includes an optoelectronic display with electrophoretic ink;
   a control module that is configured to communicate with the display device;
   a power source, wherein a visual characteristic of the display device is configured to correspond with a gait cycle that includes a plurality of gait subphases; and
   a sensor in electrical communication with the control module,
   wherein the visual characteristic includes at least three different states that correspond to at least three different subphases of the gait cycle,
   wherein the control module is configured to, in response to signals received from the sensor, cause the visual characteristic of the display device to change between the at least three states,
   wherein at least two of the at least three different subphases are in a stance phase of the gait cycle, in which the article of footwear contacts a ground surface, and
   wherein the visual characteristic is at least one of: a symbol, text, an image, or an animation.

15. The display system of claim 14, wherein the visual characteristic is further comprising of at least one of a color, a transparency, a gloss unit, a power level, or a pattern.

16. The display system of claim 14, wherein the control module is configured to provide a first electrical signal or a second electrical signal to the display system, the first electrical signal causing the display system to be in a first state of the at least three states and the second electrical signal causing the display system to be in a second state of the at least three states.

17. The display system of claim 14, wherein the control module is configured to receive a user input, such that the visual characteristic is customizable by a user via the user input.

* * * * *